US 6,530,079 B1

(12) United States Patent
Choi et al.

(10) Patent No.: US 6,530,079 B1
(45) Date of Patent: Mar. 4, 2003

(54) METHOD FOR OPTIMIZING LOCKS IN COMPUTER PROGRAMS

(75) Inventors: Jong-Deok Choi, Mount Kisco, NY (US); Manish Gupta, Peekskill, NY (US); Mauricio J. Serrano, San Jose, CA (US); Vugranam C. Sreedhar, Whiteplains, NY (US); Samuel Pratt Midkiff, Upper Saddle River, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/323,989

(22) Filed: Jun. 2, 1999

(51) Int. Cl.$^7$ .............................................. G06F 9/445

(52) U.S. Cl. ..................... 717/158; 717/127; 717/128; 717/129; 717/130; 717/131; 717/152; 717/153; 717/157; 717/159; 712/227

(58) Field of Search ............................... 707/9, 158, 8; 717/158, 159, 161, 152, 153, 157, 127, 128, 129, 130, 131; 712/227

(56) References Cited

U.S. PATENT DOCUMENTS

| | | | | |
|---|---|---|---|---|
| 5,875,461 A | * | 2/1999 | Lindholm | 711/118 |
| 6,141,794 A | * | 10/2000 | Dice et al. | 717/5 |
| 6,237,043 B1 | * | 5/2001 | Brown et al. | 709/316 |
| 6,345,313 B1 | * | 2/2002 | Lindholm | 709/315 |

OTHER PUBLICATIONS

Diniz et al., "Eliminating Synchronization Overhead in Automatically Parallelized Programs Using Dynamic Feedback", ACM, pp. 89–132, May 1999.*

Giering et al., "Using POSIX Threads to Implant Ada Tasking: Description of Work in Progress", ACM, pp. 518–529, Nov. 1992.*

Xu et al., "Dynamic Instrumentation of Threaded Applications", ACM, pp. 49–59, May 1999.*

Bacon et al., "Thin Locks: Featherweight Synchronization for Java", ACM, pp. 258–268, Jun. 1998.*

Jeff Bogda et al., ☐Removing Unnecessary Synchronization in Java☐, Department of Computer Science, University of California, Technical Report TRCS99–10, Apr. 2, 1999, pp. 1–16.

(List continued on next page.)

*Primary Examiner*—Gregory Morse
*Assistant Examiner*—Ted T. Vo
(74) *Attorney, Agent, or Firm*—Whitham, Curtis & Christofferson, P.C.; Douglas W. Cameron

(57) ABSTRACT

A method and several variants for using information about the scope of access of objects acted upon by mutual exclusion, or mutex, locks to transform a computer program by eliminating locking operations from the program or simplifying the locking operations, while strictly performing the semantics of the original program. In particular, if it can be determined by a compiler that the object locked can only be accessed by a single thread it is not necessary to perform the "acquire" or "release" part of the locking operation, and only its side effects must be performed. Likewise, if it can be determined that the side effects of a locking operation acting on a variable which is locked in multiple threads are not needed, then only the locking operation, and not the side effects, needs to be performed. This simplifies the locking operation, and leads to faster programs which use fewer computer processor resources to execute; and programs which perform fewer shared memory accesses, which in turn not only causes the optimized program, but also other programs executing on the same computing machine to execute faster. The method also describes how information about the semantics of the locking operation side effects and the information about the scope of access can also be used to eliminate performing the side effect parts of the locking operation, thereby completely eliminating the locking operation. The method also describes how to analyze the program to compute the necessary information about the scope of access. Variants of the method show how one or several of the features of the method may be performed.

21 Claims, 2 Drawing Sheets

OTHER PUBLICATIONS

P. Diniz and M. Rinard, Lock–Coarsening: Eliminating Lock Overhead in Automatically Parallelized Object–Based Programs, *Proceedings of the 9th Workshop on Languages and Compilers for Parallel Computing*, San Jose, CA, Aug. 1996.

P. Diniz and m. Rinard, "Syncronization Transformations for Parallel Computing", *Proceedings of 24th SIGPLAN–SIGACT Symposium on Principles of Programming Languages*, Paris, France, Jan. 1997.

Perry E. Emrath, Sanjoy Ghosh and David Padua, "Detecting Nondeterminacy in Parallel Program", *IEEE Software*, vol. 9, No. 1, pp. 69–77, Jan. 1, 1992.

Zhixi Fang, Peiyti Tang, Pen–Chung Yew and Chuan–Qi Zhu, "Dinamic Processor Self Scheduling for General Parallel Nested Loops", *IEEE Transactions on Computers*, vol. 39, No. 7, pp. 919–929, Jul. 1990.

Manish Gupta and Edith Schonberg, "Static Analysis to Reduce Synchronization Costs in Data–Parallel Programs", *Proceedings of 23rd SIGPLAN–SIGACT Symposium on Principles of Programming Languages*, St. Petersburg, Florida, Jan. 1996.

Zli and Walid Abu–Sufah, "On Reducing Data Synchronization in Multiporcessed Loops", IEEE Transactions on Computers, vol. C–36, pp. 105–109, No. 1, Jan. 1987.

Samuel P. Midkiff and David A. Padua, "Compiler Algorithms for Synchronization," IEEE Transactions on Computers, vol. 36, No. 12, pp. 1485–1495, Dec. 1897.

M. O'Boyle and F. Bodin, "Compiler Reduction of Synchronization in Shared Virtual Memory System", *Proceedings of 9th ACM International Conference on Supercomputing*, Barcelona, Spain, Jul. 1995.

C.–W. Tseng, "Compiler Optimizations for Eliminating Barrier Synchronization," Proceedings of *5th ACM Symposium on Principles and Practices of Parallel Programming*, Santa Barbara, CA, Jul. 1995.

H.M.Su and P.C. Yew, "On Data Synchronization for Multiprocessors", *ACM Procedings of the 16th International Symposium on Computer Architecture*, 1989, pp. 416–423.

\* cited by examiner

METHOD FOR OPTIMIZING LOCKS IN COMPUTER PROGRAMS

BACKGROUND OF THE INVENTION

1. Field of the Invention

The present invention relates to computer programming. In particular it is a method and variant of the method for a compiler (either static or dynamic), programming development environment or tool, or programmer to transform a program or part of a program so as to reduce the overhead of lock operations by either removing the lock operations or replacing them with simpler operations, while strictly preserving the exact semantics of the program or parts of the program that existed before the transformation.

2. Background Description

Multithreaded programming languages, for example Java™ [5] and programs built from sequential languages but executing in a multithreaded environment, for example Posix [2] often use locking operations. These locking operations are used to enforce the constraint that only one thread of execution may have access to some resource—data, hardware, code, etc. at a time. A thread is a locus of control in a computing environment. In an object-oriented Language such as Java™, the lock is typically associated with an object and is used to ensure mutual exclusion in accessing that object. In those cases, the lock is regarded as a part of that object. (Java is a trademark of Sun Microsystems, Inc.)

Each lock has associated with it some storage that is used to implement the lock. This storage provides a flag to indicate if the lock has been acquired by anyone else. The lock can also provide a queue. The queue provides a place for a thread that attempts to acquire a lock that has already been acquired by another thread to wait for the lock to become free. A thread that is on a queue is quiescent, i.e. it is not actively executing. If a lock provides a queue, it must provide some mechanism for threads on the queue to be notified that they can exit the quiescent state and again attempt to acquire the lock. This mechanism is referred to as the notify operation. Locks may also have side effects associated with them. For example, in the Java™ programming language, or various run-time and hardware systems that implement a release consistency programming model [1], a locking operation must update the globally accessible copy of a variable if required by the semantics of programming language or release consistency model being implemented. Other side effects could include updating tables indicating which locks are held by the program, or providing a point for a breakpoint operation in a debugger. Locking operations, and the locks needed to support the locking operation, have a cost in both an increased execution time of the program and in the amount of computer storage necessary for the program to execute.

Many compilers use a representation called a "call graph" to analyze an entire program. A call graph has nodes representing procedures, and edges representing procedure calls. The term "procedure" is used to refer to subroutines, functions, and also "methods" in object-oriented languages. A direct procedure call, where the callee (called procedure) is known at the call site, is represented by a single edge in the call graph from the caller to the callee. A procedure call, where the callee is not known, such as a "virtual method" call in an object-oriented language or an indirect call through a pointer, is represented by edges from the caller to each possible callee. It is also possible that, given a particular (callee) procedure, all callers of it may not be known. In that case, the call graph would conservatively put edges from all possible callers to that callee.

Within a procedure, many compilers use a representation called the "control flow graph" (CFG). Each node in a CFG represents a "basic block" and the edges represent the flow of control among the basic blocks. A basic block is a straight-line sequence of code that has a single entry (at the beginning) and a single exit (at the end). A statement with a procedure, call does not disrupt a straight-line sequence of code. In the context of languages that support "exceptions", such as Java™, the definition of a basic block is relaxed to include statements which may throw an exception. In those cases, there is an implicit possible control flow from a statement throwing an exception to the block of code handling the exception. The basic block is not forced to end at each such statement, and instead, such a basic block bb is said to have a flag bb.outEdgeInMiddle set to true.

A topological sort order enumeration of nodes in a graph refers to an enumeration in which, if the graph contains an edge from node x to node y, then x appears before y. If a graph has cycles, then such an enumeration is not guaranteed for nodes involved in a cycle. A reverse topological sort order lists nodes in the reverse order of a topological sort.

Prior art for a similar goal of reducing the synchronization costs of a program by a compiler or programming tool or environment can be found in the papers [3,4,5,6,8,9,10,11, 12,13]. These methods do not perform a class of optimizations, that of removing synchronization from objects acted upon by mutual exclusion, or mutex locks, based on the scope in which the lock is accessed. Furthermore, these methods do not handle programs with explicit constructs for multithreading and exceptions (e.g. "try-catch" constructs in Java™).

Prior art for reducing locking or synchronization operations by a compiler, programming tool or environment can be found in the papers [5,6,8,9,10,11,12,13]. The techniques described in these papers look at advance/wait, post/wait/ clear and full/empty and extended full/empty or counter based synchronization. All of these synchronization methods enforce ordering (i.e., producer/consumer) synchronization, and the goal of these techniques is to transform programs so as to reduce the amount of ordering synchronization. Ordering synchronization is typified by post/wait/clear synchronization. A post operation on locks involves acquiring a lock on a key K, setting K to a known value (usually 1), and releasing the lock on K. A wait operation on key K involves repeatedly examining the value of K until it reaches the known value. A clear operation first acquires the lock on K, and then sets the value of K to another known value (usually 0). The clear operation is used to initialize K. Thus, by using clear/post/wait, an order can be enforced among the statements that pre cede the post and follow the wait. In particular, all statements before the post can be made to execute before any statement after the wait. All of the techniques described above use the ordering information. In particular, they determine what orders enforced by some ordering synchronization operations are enforced by other ordering synchronization operations, and eliminate the former synchronization operations. In some cases, a reduced number of new operations are introduced to eliminate all of the old operations [9], and in other cases the old state of keys are known after wait operations to reduce the number of initializing clear operations [6].

Prior art for reducing synchronization for mutex locks can be found in the papers [3,4]. In [3], the number of lock operations is reduced by a coarse-graining transformation, which leads to a single lock ensuring mutual exclusion for a coarser grain region, rather than multiple locks ensuring mutual exclusion for various finer-grain regions. While this reduces the number of lock operations, it leads to the problem of false exclusion, where operations that do not need mutual exclusion are also carried out in mutual exclusion. Therefore, the reduction in the number of lock operations comes at a price of potentially increased contention due to the lock. This transformation can sometimes degrade the performance of the program. In [4], the program is transformed so that multiple lock operations on the same object are replaced by a single lock operation on that object. While eliminating lock operations, this method has to retain at least one lock operation that achieves the same synchronization as the eliminated lock operations, i.e., it cannot eliminate mutex locks entirely from computation.

SUMMARY OF THE INVENTION

It is therefore an object of the invention to provide a method to reduce the number of locking operations that are performed in a computer pro,gram, by performing analysis to determine when these transformations can be applied, while preserving the strict semantics of the untransformed program.

It is another object of the invention to provide a method to simplify locking operations that cannot be completely removed by performing analysis to determine when these transformations can be applied, all while preserving the strict semantics of the untransformed program.

It is another object of the invention to provide a method for a compiler, programming development environment or tool, or programmer to transform a program or parts of a program written in some machine language so as to reduce the number of locking operations specified in the program or part of a program that must be performed when the program executes, or to reduce the cost of these operations with respect to increased execution time of the program and in the amount of computer storage necessary, or all of the above.

According to the invention, the locking operation is divided a into two parts:

1. Those parts of the locking operation necessary to provide mutual exclusion, and to enqueue and dequeue threads that have attempted to acquire a lock already held by one or more other threads. These parts of the locking operation are referred to as the "synchronization" operation for mutual exclusion or alternatively, the "acquire" and "release" parts of the locking operation.

2. Those parts of the locking operation that do other than synchronization for mutual exclusion. These parts of the locking operation are called the "side-effects." In Java™, for example, the side-effects of a locking operation are the actions that update from the Java™ working memory to the Java™ main memory those values of shared variables that have changed since the last locking operation in this thread.

The present invention analyzes a program and uses the information formed by that analysis to transform the program, thereby reducing the number of locking operations that are performed in a program. If a locking operation cannot be completely removed from the program, the method substitutes a simpler operation for the locking operation. The ability to perform these transformations is important for two reasons:

1. Locking operations increase the execution time of the programs. In some programs they may take a majority of the execution time.

2. The necessity of enforcing the side effects can be significant, both in compile time and in increased memory traffic, I/O operations, and computer bus traffic. These costs can affect not only the performance of the program performing the locking operation but also other programs executing in the computer system.

Thus, the transformations described in this invention are important to decrease the execution time and storage requirements of the program being transformed, and to increase the performance of other programs executing on the system.

A locking operation with both synchronization for mutual exclusion and side effects is called as a "comprehensive" locking operation, and a locking operation with only synchronization for mutual exclusion is called a "simple" locking operation.

The preferred method of the present invention first analyzes all possible references to every object on which a locking operation is performed. The result of this analysis is, for each object, information about whether a locking operation can be performed on it in more than one thread. If the object is not accessed in multiple threads, and its locking operations are simple, the locking operations can be removed, and a process is performed to cause this transformation of the program. Next, the program is analyzed to determine for each comprehensive locking operation whether its side effects are required. When this analysis has been performed, the results are used to determine for each comprehensive locking operation, along with the results of the earlier analysis, whether 1. the object is not locked in multiple threads, and the side effects of the locking operation are not needed, and the locking operation can be removed from the program;

2. the object is not locked in multiple threads, but the side effects of the locking are needed, therefore only the side effect part of the locking operation needs to be performed, and the locking operation is replaced with a simpler form that does only the side effects;

3. the object is locked in multiple threads, but the side effects of the comprehensive locking operation are not needed, therefore only the acquire and release parts of the locking operation needs to be performed, and the locking operation is replaced with a simpler form that does only the acquire and release parts of the locking operation; or 4. the object is locked in multiple threads, and side effects of the comprehensive locking operation side effects are needed, thus the lock will not be optimized;

An alternative embodiment of the method performs the analysis of the procedure to determine the number of threads an object can be locked in, and removes simple locking operations that are on an object accessed in only a single thread. For comprehensive locking operations, if the object being locked is accessed in only a single thread, then the locking operation is; replaced by a simpler operation that only performs the locking operation side effects.

Another alternative embodiment of the method performs the analysis of the procedure to determine the number of threads an object can be locked in, and removes simple locking operations that are on an object accessed in only a single thread. For comprehensive locking operations, if the object is being accessed in only a single thread, and further analysis of the procedure determines that the side effects of the locking operation are not needed, the locking operation is removed. Other locking operations with side effects are unoptimized.

Another alternative embodiment of the method performs the analysis of the procedure to determine the number of threads an object can be locked in, and removes simple locking operations that are on an object accessed in only a single thread. Comprehensive locking operations are not optimized by this variant.

Another alternative embodiment of the method does not consider simple locking operations. For comprehensive locking operations, th, analysis and transformations are performed as in the original method.

Another alternative embodiment of the method does not consider simple locking operations, and only simplifies, but does not remove locks. For comprehensive locking operations, if the object being locked is accessed in only a single thread, then the locking operation is replaced by a simpler operation that only performs the locking operation side effects.

Another alternative embodiment of the method does not consider simple locking operations, and only removes but does not simplify locks. For comprehensive locking operations, if the object is being accessed in only a single thread, and the analysis of the method determines that the side effects of the locking operation are not needed, the locking operation is removed. Other locking operations with side effects are unoptimized.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
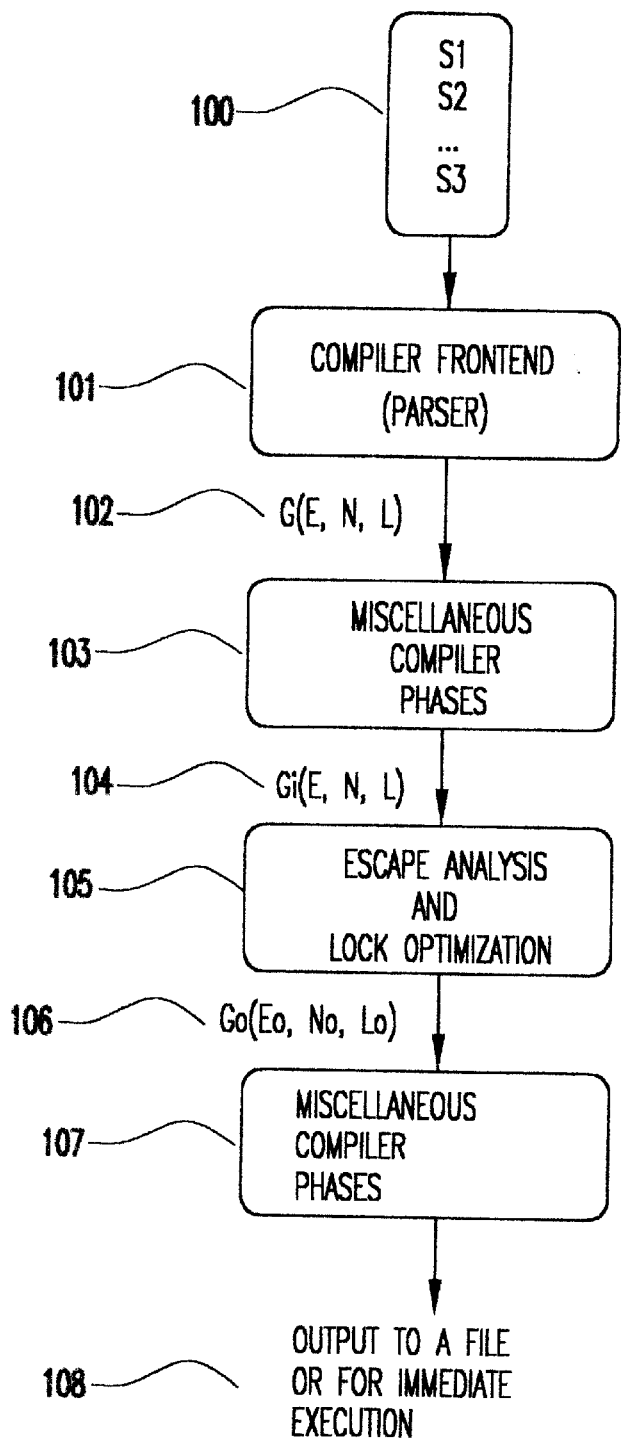
FIG. 1 shows a block diagram of a compiler or compilation system that uses the method of this invention.

Reducing And Simplifying Locking Operations in Programs With Simple and Comprehensive Locking Operations Referring now to the drawings, and more particularly to FIG. 1, there is shown an embodiment of the invention. A computer program 100 has been transformed into a list of instructions 102 by the front end or parser 101. The list of instructions can be represented by a graph (G(E,N,L)) whose nodes N are operations on variables, and whose edges E represent the flow of control between instructions. It is not necessary that they be encoded as such, and may be encoded as records in a file, as a logically flat structure, or by other means. The instructions are the instruction set of an intermediate compiler language or machine. L, the labels of the graph, contain auxiliary information about the edges and nodes in the graph. Some of the instructions at nodes on the graph are locking operations. The locking operations are of two types. The first type have no side effects. These locking operations are referred to as $O_N$ The second type have side effects. These locking operations are referred to as $O_S$. The subscript may be augmented with the number or symbol to further distinguish among different operations, as in, e.g., $O_{S,1}$ or $O_{Sj}$. Both locking and unlocking operations are treated under the category of locking operation. Several other types of operations are of interest. The second are the references to variables in the program. The $r^{th}$ static reference to the variable V is referred to as $V_r$. References may be either reads or writes. Another type of operation of interest is a procedure invocation.

The types of side effects performed by $O_S$ locking operations are now described. A write to a shared variable, or object, in an executing computer program is typically initially made to the local storage of the processor that performs the lock. Actions are then performed against the computer memory system to update a (logically) global, shared version of the variable or object with the results of the lock. This update is initiated before the next $O_S$ operation completes, and must be completed before the next $O_S$ operation commences. The side effect of the $O_S$ operation is to ensure that all updated to global shared variables or objects that were initiated in the same thread that is executing the $O_S$ operation must complete before the $O_S$ operation completes.

The list of instructions 102 is optionally utilized by compiler, programming tool, or programming development operations 103 that may precede the Escape Analysis and Lock Optimization phase 105. These optional phases may or may not transform the instruction stream encoded in G. The output of these phases is referred to as Gi 104, and is utilized by the Escape Analysis and Lock Optimization phase 105. The Escape Analysis and Lock Optimization phase transforms the program representation into $G_o$ 106 by possibly removing and adding instructions.

Figure 2:
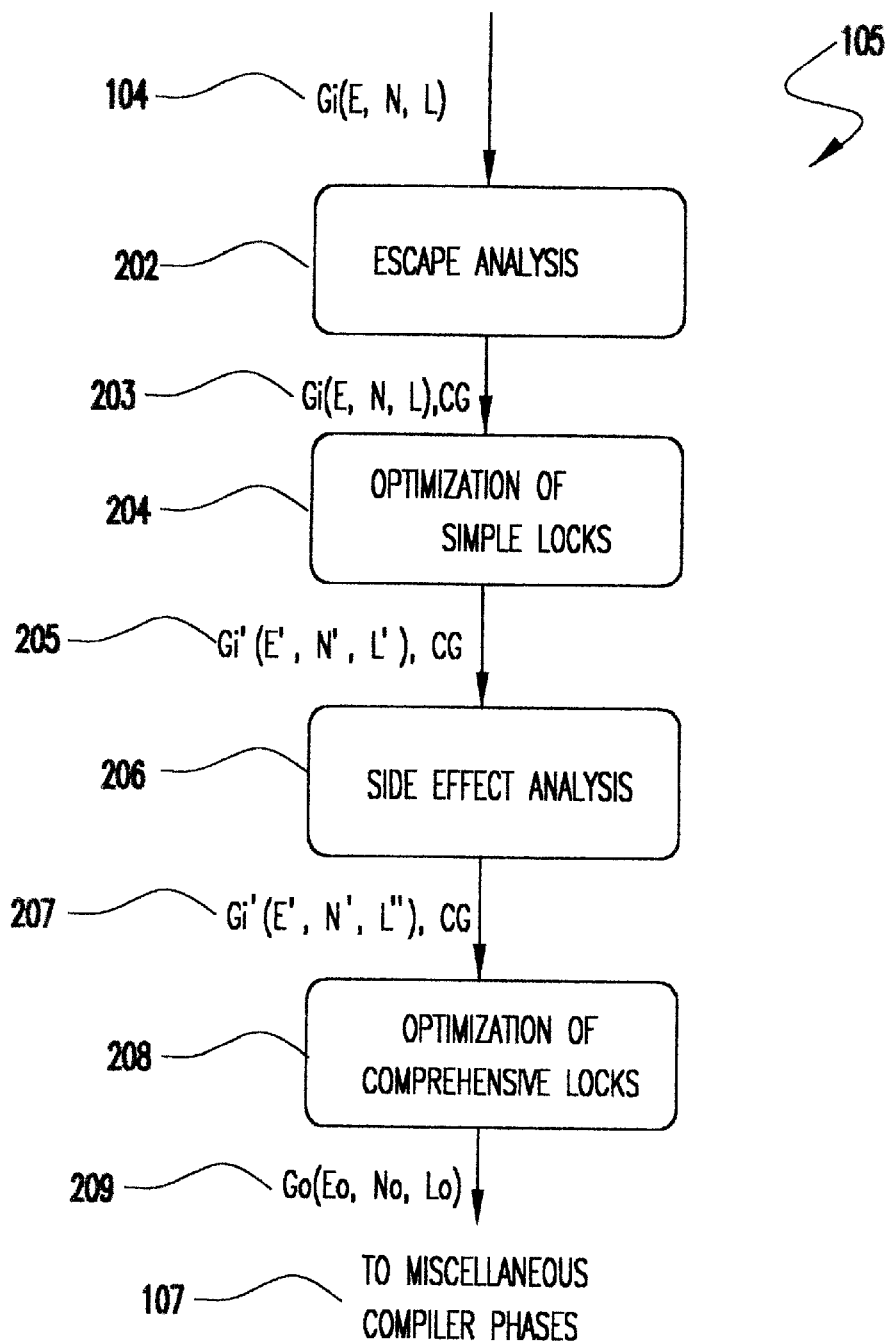
FIG. 2 shows a block diagram of the method of this invention.

FIG. 2 illustrates the actions performed by the Escape Analysis and Lock Optimization phase 105. This phase is described in more detail below, and in pseudocode lines 301 to 1535. First, Escape Analysis 202 is performed. It transforms the input Gi 104 to the Escape Analysis and Lock Optimization phase by augmenting the symbol table of the intermediate representation with escape analysis information and also obtaining information about connections between objects and pointers in the program in the form of a "connection graph." Essentially, for each object variable in the program, the escape analysis 202, further described below, identifies those locks that are accessed by just a single thread. This in turn serves as input 203 to the Optimization of Simple Locks phase 204, which transforms Gi 203, producing Gi' 205. The transformations are discussed in more detail below, and in pseudocode lines 1901 to 1914, below. The output from this phase, Gi' 205, and the escape analysis information found in the connection graph CG 205, is utilized by the Side Effect Analysis phase 206. This phase transforms its input 205 by augmenting the nodes of the control flow graph of the methods with the information described in the following structure,

| pre-existing data for call graph node |
| --- |
| visited |
| IN |
| OUT |
| GEN |
| KILL | where,
- visited is true if this node is being visited in some traversal, and false otherwise,
- IN is true if any predecessor of the node has a true output, and false otherwise,
- OUT equals IN ∧KILL V GEN for the Node,
- GEN is true if the node performs an operation on an object that is affected by the side effects of a locking operation with side effects, and false otherwise, and
- KILL is false if the node operation is a comprehensive locking operation, and true otherwise.

The updated fields added to nodes of the control flow graph contain information about side effects that must be handled by each lock $O_S$ in 208. The data structures 207 are further transformed by the Optimization of Comprehensive Locks phase 208, described below in more detail and in pseudocode lines 2201 to 2225. The information of value to future passes is contained in $G_o$ 209, which is then passed to later compiler passes 107 as shown in FIG. 1.

The final transformed program resulting from the method of this invention can be fed into other phases of a compiler, programming environment or program development tool in step 108, for further manipulation, or it can be stored into a file for later retrieval, analysis or processing.

The preferred embodiment can be better understood by analyzing each step of the process using pseudocode. The preferred embodiment is described below, and then variants are described by noting how these alternative embodiments differ from the preferred embodiment. A discussion of the preferred escape analysis phase, as shown in FIG. 2, step 202, is first described below.

The Escape Analysis Phase

For analyzing program code, a representation called a connection graph CG=(N, E) is used, which is a directed graph with nodes (forming the set N) representing variables, and edges (forming the set E) representing reachability connections between variables. There are two kinds of nodes: "object" nodes representing variables for data allocated in a program (hereafter referred to as object variables), and "pointer" nodes, representing variables that point to object variables. Each object may have zero or more fields. In some languages, like Java™, fields of an object can only be pointer variables, whereas in some other languages like C++, a field of an object may either be a pointer or another object. A node corresponding to a field of an object variable is also referred to as a field node; it may fundamentally be a pointer node, or in languages that allow it, an object node. Given the connection graph of a procedure, the term "phantom node" is used to refer to a node corresponding to an object that is created outside the procedure and is reachable from a formal parameter. A node, during various stages of the analysis, may have one of the following three states: global_escape, arg_escape, or procedure_local. Each node, with two exceptions, is marked procedure_local when created initially. The first exception is for a phantom node, which is marked arg_escape. The second exception is for an object that may correspond to a thread (and the fields of that object), for example, in Java™, any object of a class that implements the Runnable interface. Such an object is marked global_escape upon creation, signifying that it escapes the thread in which it is created, i.e., this object itself is not thread-local. Even though each runnable object is marked global_escape the fields of that object are initially marked arg_escape. The terms "variables" and "nodes" are used interchangeably during the description of this invention, where it is clear that the node referred to in the connection graph represents the given variable.

The connection graph has three kinds of edges: "points-to" edges, "deferred edges", and "field" edges. A points-to edge, denoted as $x^P \rightarrow y$, may be created from a pointer variable x to an object variable y. A deferred edge, $x^D \rightarrow y$, may be created from one pointer variable x to another pointer variable y. In languages that allow copying assignment from one object to another, such as C++, a deferred edge may exist from one object node to another. Such a deferred edge from an object $O_1$ to an object $O_2$ is interpreted as a set of edges from each field in $O_1$, to the corresponding field in $O_2$. A field edge, $x^F \rightarrow y$, may be created from an object node x to a field node y.

A points-to path (PtPath(x,y)) in a connection graph is defined to be a sequence of edges $x \rightarrow x_1 \rightarrow x_2 \rightarrow \ldots \rightarrow y$, where x is a pointer node and y is an object node. The length of a points-to path, (Length(PtPath(x,y))), is the number of object nodes (including y) encountered along the path PtPath(x, y). The notation $x^{+1} \rightarrow y$ denotes a points-to path, PtPath(x,y), with length one.

In order to illustrate the method of the invention pseudocode is used. The line number or step of the pseudocode is used in order to describe the method. The following pseudocode describes the process of escape analysis on a program P.

301: EscapeAnalysis (G, CG) {
    302: Build call-graph, CallG, of program represented by G;
    303: foreach procedure n of program do
        304: n.NumNodes=0;
        305: n.NumPaths=0;
    306: end do
    307: Set WorkList=enumeration of nodes in CallG in reverse topological sort order;
    308: while WorkList not empty do
        309: Get first element n and delete it from WorkList;
        310: Call AnalyzeStackProcedure(n, CallG, WorkList);
    311: end do
    312: Set WorkList=enumeration of nodes in CallG in topological sort order;
    313: while WorkList not empty do
        314: Get first element n and delete it from WorkList;
        315: Call AnalyzeThreadProcedure(n, CallG, WorkList):
    316: end do
    317: In symbol table for G, mark all variables whose state is not global_escape as thread-local;
318: }

The EscapeAnalysis procedure in line 301 takes as input a representation G of the program, and modifies G to record information about variables which are accessed only by a single thread, and also generates information about the connections between pointers and objects in various procedures of the program in the form of a connection graph CG. A call graph of the program is built in line 302. If a node in the call graph corresponds to a procedure which the system chooses not to analyze, it is marked no-analyze in the call graph. Examples of such procedures include native methods in Java™, which the system may choose not to analyze further, or procedures from a different module (such as a dynamically linked library) whose changes are not supposed to change the behavior of the program being generated. Lines 303 through 306 perform an initialization for each procedure that will be used later to check for convergence of the analysis. The nodes in the call graph are added in a reverse-topological sort order to a work list in line 304. In the absence of cycles in the call graph, this ensures that a callee procedure appears in the work list before any of its callers. Loop 308 iterates over each procedure in the work list until the work list is empty. The procedure n at the head of the work list is removed from the work list in line 309. It is analyzed by AnalyzeStackProcedure in line 310 to obtain a classification of each variable in the procedure into one of the following categories: global_escape, arg_escape and procedure_local. AnalyzeStackProcedure described further below, also puts each caller of procedure n back on the work-list if the classification of any variable changed during that invocation of AnalyzeStackProcedure. This ensures that the program is analyzed correctly in the presence of cycles in the call graph, which arise due to recursion. After the work list becomes empty in line 311, a classification of all program variables is made into one of the following categories: global_escape, arg_escape and procedure_local. A new work list is initialized to have all procedures listed in topological sort order in line 312. Loop 313 iterates over each procedure in the work list until the work list is empty. The procedure n at the head of the work list is removed from the work list in line 314. It is analyzed by AnalyzeThreadProcedure in line 315 to check whether any arg_escape variable in the procedure should be changed to global_escape. AnalyzeThreadProcedure described further below, also puts each callee within procedure n back on the worklist if the classification of any variable changed during that invocation of AnalyzeThreadProcedure. In line 317, after all procedures have been analyzed, all program variables that are not marked global_escape (i.e., those that are marked arg_escape or procedure_local) are marked thread-local in the symbol table ST. Note that this is just a logical step; it can be achieved by structuring the test for thread-local variables to check for the global_escape flag, so there is no need for a separate traversal of the symbol table for this step. The information obtained by the connection graphs for various procedures in the program is also retained, so that during a later phase, the compiler can determine whether an object is thread-local or not, given either an object or a pointer to an object at a particular statement in the program (this test is referred to as IsThreadLocal in lines 1911 and 2212, to be described later).

The following pseudocode describes AnalyzeStackProcedure as called in line 310, above, which obtains a classification of each variable in the procedure n into one of the following categories: global_escape, arg_escape and procedure_local.

401: AnalyzeStackProcedure(n, CallG, Worklist) {
    402: Build an initial connection graph, CG, for procedure n;
    403: if n is marked as no-analyze then // make pessimistic assumption
        404: foreach actual parameter and return node $a_i$ do
            405: state($a_i$)=global_escape;
        406: end do
    407: return;
    408: endif
    409: Build control flow graph, CFG, of procedure n;
    410: Set BBWorkList=enumeration of nodes in CFG in topological sort order;
    411: while BBWorkList not empty do
        412: Get first element bb and delete it from BBWorkList;
        413: AnalyzeBB(n CG, CFG, bb, BBWorkList);
    414: end do
    415: if (IsChanged(n)) then
        416: foreach caller $c_i$ of procedure n do
            417: if $c_i$ is not marked as no-analyze then
                418: add $c_i$ to WorkList,
            419: endif
        420: end do
    421: endif
422: }

An initial connection graph for the procedure is built in line 402. This connection graph has nodes for each pointer variable in the procedure., including those that are formal parameters of the procedure. For each $i^{th}$) formal parameter $f_i$ and for the return value that is a pointer, there are two nodes in the connection graph, one referred to as $f_i$, and the other referred to as $a_i$, a placeholder for the corresponding actual parameter passed in or return value used at different call sites of the procedure. The connection graph initially created for the procedure has a deferred edge from each formal parameter node $f_i$ to the corresponding $a_i$. Line 403 first checks if this procedure is marked no-analyze. If so, in lines 404 through 406, each node $a_i$, which serves as the placeholder for an actual parameter or return value, is marked global_escape and no further processing is done. If the procedure is not marked no-analyze a control flow graph of the procedure is built in line 409. The nodes of the control flow graph, representing basic blocks in the procedure, are added in topological sort order to a work list BBWorkList in line 410. Loop 411 iterates over each entry in BBWorkList until that work list is empty. The basic block bb at the head of the work list is removed from the work list in line 412. It is analyzed by AnalyzeBB in line 413, described further below in lines 501 to 517. In line 415, the call to IsChanged described further below, determines if the classification of any variable changed during this invocation of AnalyzeStackProcedure. If there was a change, each caller of the procedure n is added to the work list WorkList consisting of the procedures which need to be analyzed further.

The pseudocode below describes AnalyzeBB which is called in line 413 above, and is used to analyze a given basic block bb.

501: AnalyzeBB(n, CG, CFG, bb, BBWorkList) {
    502: foreach predecessor basic block p of bb in CFG do
        503: foreach pointer variable v do
            504: merge connections for variable v in the representation for p;
            505: if merge leads to any new connection for v in bb then
                506: add successors of bb in CFG to BBWorkList,
            507: endif
        508: end do
    509: end do
    510: foreach statement S of basic block bb in forward order do
        511: switch (statement type)
        512: case assignment: AnalyzeAssign(CG, S, bb.outEdgeInMiddle);
        513: case procedure call: AnalyzeProcCall(n, CG, S);
        514: case return or exit: Summarize(n, CG);
        515: endswitch
    516: end do
517: }

Loop 502 iterates over each basic block p which is a predecessor of bb in the control flow graph. Loop 503 iterates over each connection graph node representing a pointer variable. In line 504, the connections for each pointer variable node are merged with the connections for that pointer variable, as they exist in basic block p. If this merging of connections leads to any new edges being introduced for variable v in bb, the successors of bb in the (control flow graph are added, in line 506, to BBWorkList to ensure that those basic blocks are analyzed again. Loop 510 iterates over each statement in its order of appearance in the basic block bb. Based on the check for the type of statement in line 511, the appropriate analysis is done. If the statement is an assignment statement, it is handled by AnalyzeAssign in line 512, described further below. If the given basic block bb appears in an exception block in the current procedure, such as a "try" block as part of a "try-catch" constrict in Java™, the last parameter to AnalyzeAssign (bb.outEdgeInMiddle) is true. This parameter ensures that AnalyzeAssign takes into account the possible control flow out of the basic block due to an exception thrown in that basic block.

If the statement consists of a procedure call, it is handled by AnalyzeProcCall in line 513, described further below. If the statement represents the end of the procedure or a return from it, the connection graph for the procedure is summarized by Summarize as shown in line 514 and described further below.

The pseudocode below describes AnalyzeAssign which is called in line 512 above.

601: AnalyzeAssign (CG, S, noKill) {
    602: switch (statement type)
        603: case [$a_1.a_2. \ldots a_n$=(address of) O;]
            604: AnalyzeAssignCase1 (CG, S, nokill)
        605: case [$a_1.a_2. \ldots a_n=b_1.b_2. \ldots b_m$]
            606: AnalyzeAssignCase2 (CG, S, noKill)
    607: endswitch
608: }

Lines 602 through 607 check for two types of assignment statements, which are illustrated as case [$a_1.a_2. \ldots a_n$=(address of) O] and as case [$a_1.a_2. \ldots a_n=b_1.b_2. \ldots b_m$]. For the first case, the procedure AnalyzeAssignCase1 is called in Line 605, and for the second case, the procedure AnalyzeAssignCase2 is called in line 607.

The pseudocode below describes AnalyzeAssignCase1 which analyzes statements of the form $a_1.a_2. \ldots a_n$=(address of) O. This represents all assignment statements where a pointer gets the value of the address of an object which may be allocated dynamically or statically. The actual notation for this kind of statement varies in different languages. For instance, in Java™, the statement may appear as $a_1.a_2. \ldots a_n$=new Constructor(. . .).

701: AnalyzeAssignCase1(CG, S, nokill) {
    702: // S is: $a_1.a_2. \ldots a_n$=(address of) O;
    703: Create a new object $O_n$ (if one does not exist for this site);
    704: if ($a_1$ is a formal parameter and no phantom node for $a_1$ exists) then
        705: Create phantom nodes $O_2, O_3, \ldots O_{n-1}$ such that $a_2$ is a field in $O_2$, $a_3$ is a field in $O_3$, and so on; Insert points-to edge from $a_1$ to $O_2$, from $a_2$ to $O_3$, and so on.
    706: endif
    707: if (n=1) then
        708: Let R be the set of incoming deferred edges into $a_1$;
        709: Let S be the set of outgoing points-to edges from $a_1$;
        710: Let T be the set of outgoing deferred edges from $a_1$;
        711: if (not noKill) then
            712: Add new points-to edges from the source node of edges in R to target nodes of edges in S;
            713: Add new deferred edges from the source node of edges in R to target nodes of edges in T;
            714: Delete all edges in the sets R, S, and T from CG;
        715: endif
        716: Add a points-to edge from $a_1$ to $O_n$;
    717: else
        718: Find all the field nodes $a_n$ starting from node $a_1$ corresponding to the path $a_1.a_2. \ldots a_n$; Let A be the set of all $a_n$ nodes;
        719: if (for any $a_i$ node, $1 \leq i \leq n$, state($a_i$)=global_escape) then
            720: MakeBottom($O_n$);
        721: else
            722: Add a points-to edge from each node in A to $O_n$;
        723: endif
    724: endif
725: }

Line 703 first creates a new object node $O_n$ (if one does not already exist for this site). Next, line 705 creates phantom nodes and edges in case $a_1$ is a parameter (if the phantom nodes have not yet been created). These phantom nodes and edges are needed for interprocedural analysis to collect procedural summary information. At line 707, if n is 1 the general case can be simplified (specialized) to $a_1$=(address of) O. This simplified case is handled in Lines 708 through 716. First, line 711 checks if it is safe to kill the information about the previous connections of $a_1$; whether or not to "kill" was originally determined for the entire basic block in line 512 above. Effectively, this check ensures that if the given statement S appears inside an exception block within the current procedure, such as inside a try block in Java™, the previous connections of $a_1$ are not killed. Thus, the analysis remains valid in case an exception is thrown and the control is transferred to an exception handling code (such as the "catch" block in Java™) within the procedure. The present invention allows previous connections of $a_1$ to be killed if the statement S does not appear in an exception block in the current procedure, even if dynamically, it appears inside an exception block of a calling procedure. Since the new value of $a_1$ would not be visible at any exception handling code outside the current procedure, it is safe to kill the previous connections of $a_1$ within the procedure in this case.

If it is safe to kill the previous data flow information, lines 712 and 713 bypass $a_1$ by connecting the predecessor nodes of $a_1$ with the successor nodes of $a_1$, and 714 deletes the previous incoming edges into $a_1$ and the previous outgoing edges from $a_1$. These steps 712 through 714 may actually be implemented using a new node for $a_1$ and using this new node for $a_1$ instead of the previous node for $a_1$ from this point onwards. A points-to edge is added from the node for $a_1$ to $O_n$ in 716. The more general case of the assignment statement, where n is larger than 1 is handled in Lines 718 through 723. No deletion of edges is done in this case. Line 718 identifies all the field nodes in the connection graph at path length n from $a_1$ corresponding to the path $a_1.a_2 \ldots a_n$. Let all of these field nodes form the set A. If during the traversal of nodes during the previous step in line 718, any node with state global_escape was encountered, the object $O_n$ (and any node reachable from it) is also marked global_escape by invoking MakeBottom on $O_n$. Finally, in line 722, a points-to edge is added from each node in the set A (computed in line 718) to $O_n$.

The following pseudocode describes AnalyzeAssign-Case2 which analyzes statements of the form $a_1.a_2. \ldots a_n=b_1.b_2. \ldots b_m$.

801: AnalyzeAssignCase2 (CG, S, noKill){
    802: // S is: $a_1.a_2. \ldots a_n=b_1.b_2. \ldots b_m$;
    803: if ($a_1$ is a formal parameter and no phantom node for $a_1$ exists)
        804: Create phantom nodes $O_2, O_3, \ldots O_{n-1}$ such that $a_2$ is a field in $O_2$, $a_3$ is a field in $O_3$, and so on; Insert points-to edge from $a_1$ to $O_2$, from $a_2$, to $O_3$, and so on.

805: endif
806: if ($b_1$ is a formal parameter and no phantom node for $b_1$ exists)
  807: Create phantom nodes $Q_2, Q_3, \ldots Q_{m-1}$ such that $b_2$ is a field ii $Q_2$, $b_3$ is a field in $Q_3$, and so on; Insert points-to edge from $b_1$ to $Q_2$, from $b_2$ to $Q_3$, and so on.
808: endif
809: Find all the field nodes $b_m$ starting from node $b_1$ corresponding to the path $b_1.b_2\ldots b_m$; Let B be the set of all $b_m$ nodes.
810: if (n=1) then
  811: Let R be the set of incoming deferred edges into $a_1$;
  812: Let S be the set of outgoing points-to edges from $a_1$;
  813: Let T be the set of outgoing deferred edges from $a_1$;
  814: if ($a_1$ is a pointer and not noKill) then
    815: Add new points-to edges from the source node of edges in R to target nodes of edges in S;
    816: Add new deferred edges from the source node of edges in R to target nodes of edges in T;
    817: Delete all edges in the sets R, S, and T from CG;
  818: endif
  819: Add a deferred edge from $a_1$ to each node in B;
820: else
  821: Find all the field nodes an starting from node $a_1$ corresponding to the path $a_1.a_2\ldots a_n$; Let A be the set of $a_n$ nodes.
  822: if (for any $a_i$ node, $1 \leq i \leq n$, state(a)=global escape) then
    823: foreach node b in B do
      824: MakeBottom(b);
    825: end do
  826: else
    827: Add a deferred edge from each node in A to each node in B;
  828: endif
829: endif
830: }

As described above for AnalyzeAssignCase 1, phantom nodes and edges are created whenever $a_1$ or $b_1$ is a formal parameter. This is done in Lines 803 through 808. Then line 809 identifies all the field nodes in the connection graph at path length m from $b_1$ corresponding to the path $b_1.b_2\ldots b_m$. Let all of these field nodes form the set B. When m is 1, a special case $a_1 = b_1. b_2\ldots b_m$ is handled in lines 811 through 819. If $a_1$ is a pointer and if it is safe to kill the previous connections of pointer variables in the given statement (determined, as in the case of line 711, for the entire basic block in line 512), lines 815 and 816 bypass $a_1$ by connecting the predecessor nodes of a with the successor nodes of $a_1$ and line 817 deletes the previous incoming edges into $a_1$ and the previous outgoing edges from $a_1$. These steps 815 through 817 may actually be implemented, as for the previous case, using a new node for $a_1$ and using this new node for $a_1$ instead of the previous node for $a_1$ from this point onwards. A points-to edge is added from the node for $a_1$ to each node in B in line 819. The more general case of the assignment statement, where n is larger than 1 is handled in Lines 821 through 829. No deletion of edges is done in this case. Line 821 identifies all the field nodes in the connection graph at path length n from $a_1$ corresponding to the path $a_1.a_2\ldots a_n$. Let all of these field nodes form the set A. If during the traversal of nodes during the previous step in line 821, any node with state global_escape was encountered, all nodes b in the set B (iterated over in Loop 823) are marked global_escape by calling MakeBottom in line 824, which also marks each node reachable from b as global_escape. Finally, in line 827, a deferred edge is added from each node in the set A (computed in 821) to each node in the set B (computed in line 809).

The following pseudocode describes AnalyzeProcCall which is called at line 513, above.

901: AnalyzeProcCall(S){
  902: Let $<a_i, \hat{a}_i>$, $0 \leq i \leq n-1$ be the actual parameter pairs at S.
  903: Let $<a_n, \hat{a}_n>$ be the return node pair at S.
  904: foreach target method $m_i$ at S do
    905: // Multiple candidate target methods might exist due to virtual call.
    906: foreach object node $n_o$ of the callee reachable from $a_i$ of the callee do
      907: visited ($n_o$)=false;
    908: end do
    909: foreach $<a_i, \hat{a}_i>$ pair do
      910: // For each object node $n_o$ reachable from $a_i$ of the callee, compute
      911: // its equivalent object nodes, EquivObj($n_o$, S), of the caller.
      912: // In doing so, create phantom nodes if necessary.
      913: ComputeEquivNodes ($a_i$, $\{\hat{a}_i\}$, S);
    914: end do
    915: foreach $a_i$, $0 \leq i \leq n$ do
      916: // For each object node $o_i$ reachable from $a_i$ of the callee,
      917: // if $o_i^F \to f_j^P \to o_k$, make sure
      918: // (1) $\hat{o}_i^P \to f_j^P \to \hat{o}_k$, for all $o_i$'s
      919: // equivalent nodes $\hat{o}_i$, and for all $o_k$'s equivalent nodes $\hat{o}_k$;
      920: // (2) any deferred edge from $f_i$ to another field node or $a_l$ will have
      921: // its corresponding edge between equivalent nodes at the caller
      922: InsertEdges($a_i$, S);
    923: end do
  924: end do
925: }

As explained earlier, a call site can have multiple target methods statically associated with it, which the loop 904 handles by applying the body of the loop to each target method at the call site. For each target method, line 907 first logically marks all the object nodes reachable from the actual parameter nodes of the method as "not visited." This step is not physically needed due to a version-number scheme employed. Then, for each pair of actual node of the method and the corresponding actual node at the call site, line 913 (described further at line 1001, below) computes the equivalent nodes of object and field nodes of the called method, creating phantom nodes at the caller method. Using the equivalent node information, line 919 (described in detail at line 1101 ) inserts edges, if not already existent, between nodes of the caller method if their equivalent nodes of the callee method have edges between them.

The pseudocode below describes ComputeEquivNodes which is called in line 913 to compute the equivalent nodes of object and field nodes of the called method.

1001: ComputeEquivNodes($f_{ee}$: node; EquivF: set of nodes, S: call.site) {
  1002: // EqvivF is the set of equivalent nodes of fee.
  1003: // Subscript "ee" stands for callee. and "er" stands for caller.
  1004: if (state($f_{ee}$)=global_escape) then
    1005: foreach ($f_{er} \in$ EquivF) do
      1006: MakeBottom($f_{er}$);
    1007: end do
    1008: return;
  1009: endif
  1010: foreach object node $n_o$ s . t. $f_{ee}^{\,P} \to n_o$ do
    1011: if visited($n_o$)=true then
      1012: continue; // skip the following with the current $n_o$
    1013: endif
    1014: visited ($n_o$)=true;
    1015: // $n_o$ is pointed to by $f_{ee}$
    1016: foreach $\hat{n}_o \in \{\hat{n}_o | f_{er}^{\,+1} \to \hat{n}_0, f_{er} \in \text{EquivF}\}$ do
      1017: // $f_{er}$ is one of $f_{ee}$'s equivalent nodes of the caller.
      1018: // $\hat{n}_o$ is one of the nodes pointed to by $f_{er}$.
      1019: // If no such $\hat{n}_o$ exists, create one phantom node.
      1020: EqF={}; // initialize EqF to empty set
      1021: if $\hat{n}_o \in$ EquivObj($n_o$, S) then
        1022: EquivObj($n_o$, S)=EquivObj($n_o$, S) U $\{\hat{n}_o\}$;
        1023: // add $\hat{n}_o$ to EquivObj($n_o$, S)
      1024: endif
      1025: foreach $\hat{f}_{ee}$ s.t. $n_o^F \to \hat{f}_{ee}$ do
        1026: EqF=$\{\hat{f}_{er} | \hat{n}_o^{\,F} \to \hat{f}_{er}, f \text{ id } (\hat{f}_{ee}) = f \text{ id } (\hat{f}_{er})\}$;
        1027: // Matching field nodes of $\hat{n}_o$
        1028: // become equivalent field nodes of $f_{ee}$
        1029: ComputeEquivNodes($\hat{f}_{ee}$, EqF, S); // invoke recursively
      1030: end do
    1031: end do
  1032: end do
1033: }

The first parameter, $f_{ee}$ is either an actual parameter node or a field node of an object node. Line 1004 checks if the callee node $f_{ee}$ is marked global_escape. In that case, each equivalent node of $f_{ee}$ is marked global_escape in lines 1005 through 1007, and the procedure returns in line 1008. Loop 1010 iterates over each node, no in the connection graph that has a point-to edge from $f_{ee}$, skipping no if it has already been visited (Lines 1011 and 1012) while computing equivalent nodes. If it has not been visited before, line 1014 marks it as visited for proper termination of the algorithm. Then, Loop 1016 iterates over each object node of the caller that has a point-to path of length one from any of the nodes in EquivF, which is the set of nodes of the caller equivalent to $f_{ee}$. These caller's object nodes are added to the set of equivalent nodes of the callee node $n_0$ in lines 1021 through 1024. Then, for each field node of $n_0$ iterated over in Loop 1025, line 1026 computes the, matching field nodes, EqF of the caller's equivalent. The procedure then invokes itself recursively at line 1029, using the field node of $n_0$ and the equivalent caller nodes' matching field nodes, EqF as the new parameters.

The following pseudocode describes InsertEdges which is called in line 922, and is used to insert edges out of the equivalent node of $n_i$ in the caller to reflect the effect of the procedure call. p0 1101: InsertEdges($n_i$: node, S: callsite) {
  1102: if (visited($n_i$)=true) then
    1103: return;
  1104: endif
  1105: visited($n_i$)=true;
  1106: if $n_i$ is an object node then
    1107: foreach objectnode $o_k$ s.t. $n_i^F \to f_j^P \to o_k$ do
      1108: // $o_k$ is pointed to by $f_j$, which is a field node of $n_i$
      1109: foreach object node $\hat{n}_i \in$ EquivObj($n_i$, S) do
        1110: foreach object node $\hat{o}_k \in$ EquivObj($o_k$, S) do
          1111: insert a points-to edge, if not already existing, from $\hat{f}_j$ to $\hat{o}_k$, where $\hat{n}_i^F \to \hat{f}_j$
        1112:: end do
      1113: end do
      1114: foreach object node $o_i$ s.t. $o_i^F{}_m \to f_m$, and there exists a deferred edge from $f_j$ to $f_m$ do
        1115: foreach object node $\hat{n}_i \in$ EquivObj($n_i$, S) do
          1116: foreach object node $\hat{o}_i \in$ EquivObj($o_i$, S) do
            1117: insert a deferred edge, if not already existing, from $\hat{f}_j$ to $\hat{f}_m$, where $\hat{n}_i^F \to \hat{f}_j$ and $\hat{o}_i^F{}_m \to \hat{f}_m$;
          1118: end do
        1119: end do
      1120: end do
      1121: foreach $a_p$ to which there exists a deferred edge from $f_j$ do
        1122: insert deferred edges from $\hat{f}_j$ of all $n_i$'s equivalent nodes to the equivalent node $\hat{a}_p$ of $a_p$ in the caller;
      1123: end do
      1124: InsertEdges($o_k$, S); // recursively invoke.
    1125: end do
  1126: else
    1127: foreach edge $e_j$ from $n_i$ to $n_k$ do
      1128: insert an edge of the same type from equivalent nodes, $\hat{n}_i$, of $n_i$ to equivalent nodes, $\hat{n}_k$, of $n_k$ in the caller;
      1129: if $n_k$ is not a field node then
        1130: InsertEdges($n_k$, S);
      1131: endif
    1132: end do
  1133: endif
1134: }

First, line 1102 checks, using a version-numbering scheme, if $n_i$ has already been visited. If so, the procedure returns in line 1103. The node $n_i$ is marked visited, using the version-numbering scheme, in 1105. Line 1106 checks if $n_i$ is an object node, and lines 1007 through 1125 handle that case. Loop 1107 identifies, for each field, $f_j$, of the object node, $n_i$, in the callee's connection graph, the set of object nodes, $o_k$, that have a points-to edge, onto from $f_j$. Lines 1109 through 1113 insert edges, if not already existent, from the matching field nodes of the caller's object nodes equivalent to $n_i$, to caller's object nodes equivalent to $o_k$ (the equivalent nodes of $n_i$ are iterated over in Loop 1109 and the equivalent nodes of $o_k$ are iterated over in Loop 1110). Next, Loop 1114 iterates over each object node $o_k$ that owns a field $f_m$ to which there is a deferred edge from field $f_j$ of $n_i$. Lines 1115 through 1119 insert deferred edges, if not already existent, from the matching field nodes of the caller's object nodes equivalent to $n_i$, to the matching field nodes of the caller's object nodes equivalent to $o_l$ (the equivalent nodes of $n_i$ are iterated over in Loop 1115 and the equivalent nodes of $o_l$, are iterated over in Loop 1116). Next, Loop 1121 iterates over each actual parameter node or return node, $a_p$, to which there is a deferred edge from $f_j$. Line 1122 inserts deferred edges from the matching field nodes of the caller's object nodes equivalent to $n_i$, to the equivalent node(s) of the actual parameter or return node in the caller. Line 1124 invokes the procedure recursively for the object node $o_k$ in place of $n_i$, to ensure that edges out of $o_k$ or its fields are reflected in the caller. Lines 1127 through 1132 take care of the case where $n_i$ is not an object node (i.e., it may be an actual parameter or return node). Loop 1127 iterates over each outgoing edge from $n_i$. For each such node $n_k$, 1128 inserts edges from the equivalent nodes of $n_i$ to the equivalent nodes of $n_k$ in the caller's connection graph. Furthermore, if $n_k$ is an object node, line 1130 recursively invokes the procedure for $n_k$, to ensure that edges out of $n_k$ or its fields are reflected in the caller.

The following pseudocode describes MakeBottom, which is called above in lines 720, 824 and 1006.

1201: MakeBottom(v) {
  1202: if (state(v)≠global_escape) then
    1203: state(v)=global_escape;
    1204: foreach node x reachable from v do
      1205: if (state(x)≠global_escape) then
        1206: state(x)=global escape;
      1207: endif
    1208: end do
  1209: endif
1210: }

First, line 1202 checks if the node v is not currently marked global_escape. If the node is already marked global_escape, nothing further needs to be done. Otherwise, line 1203 marks the node as global_escape. Loop 1204 goes over each node in the connection graph that is reachable from v. For each such node, x, line 1205 checks if the node is not currently marked global_escape, and in that case, line 1006 marks it global_escape.

The following pseudocode describes Summarize, which is called in line 514, above.

1301: Summarize(n,CG) {
  1302: foreach formal parameter $f_i$ of procedure n do
    1303: foreach node v in CG reachable from $f_i$ do
      1304: if (state(v)=procedure_local) then
        1305: state(v)=arg_escape;
      1306: endif
      1307: if a PtPath $v^{+1} \rightarrow w$ exists, but the edge $v^P \rightarrow w$ does not exist then
        1308: add edge $v^P \rightarrow w$;
      1309: endif
      1310: remove all deferred edges out of v;
    1311: enddo
  1312: enddo
1313: }

Loop 1302 iterates over each formal parameter, $f_i$, of the given procedure n. Loop 1303 iterates over each node, v, in the connection graph that is reachable from $_i$. If the node v is marked procedure_local, line 1305 marks it arg_escape. Furthermore, all deferred edges out of v are taken into account by creating a points to edge $v^P \rightarrow w$ (line 1308) that did not previously exist for every PtPath $v^{+1} \rightarrow w$. Thus, the effect of Summarize is to leave the nodes marked global_escape as they are, but mark other nodes that are reachable from a parameter node as arg_escape, and factor in the information from all deferred edges along those paths.

The following pseudocode describes IsChanged, which is called in line 415, above.

1401: IsChanged(n) {
  1402: RealNodes={object_nodes, field_nodes, local_variable_nodes,
  1403: actual_nodes, return_node }
  1404: NumNodes=SizeOf (Real Nodes); // number of nodes in RealNodes set
  1405: NumPaths=number of length one point to paths among nodes in RealNodes;
  1406: if (NumNodes>=n.NumNodes) or (NumPaths>=n.NumPaths) then
    1407: n. NumNodes=NumNodes;
    1408: n.NumPaths=Numpaths;
    1409: return true;
  1410: else
    1411: return false;
  1412: endif
1413: }

The algorithm determines whether there is a change in the connection graph that needs further iterations. Changes in the connection graph that need further iterations are defined to be any of the following: (1) change in the number of real nodes: object nodes, field nodes, local variable nodes, parameter nodes, and the return node; or (2) change in the number of point-to paths of length one among the real nodes. If any change has occurred, the procedure returns true in line 1409, otherwise it returns false in line 1411.

The following pseudocode describes AnalyzeThreadProcedure, which is called in line 315, above.

1501: AnalyzeThreadProcedure(n, CallG, WorkList) {
  1502: if any caller of n is marked as no-analyze then
    1503: foreach object variable $o_i$ in procedure n do
      1504: if (state($o_i$)=arg_escape) then
        1505: Makebotttom($o_i$);
      1506: endif
    1507: end do
    1508: return;
  1509: endif
p1 1510: procChange=false;
  1511: foreach thread object variable $o_i$ in procedure do
    1512: foreach field $f_k$ of $o_i$ do
      1513: if state($f_k$)≠global_escape and $f_k$ is accessed before $o_i$ is killed then
        1514: MakeBottom($f_k$); procChange=true;
      1515: endif
    1516: end do
  1517: end do
  1518: foreach object variable $o_i$ with state arg_escape in procedure n do
    1519: foreach $eo_i$ that is an equivalent object of $o_i$ in a caller of n do
      1520: if (state($eo_i$)=global escape) then
        1521: if (state($o_i$) g global escape) then
          1522: MakeBottom($o_i$);
          1523: procChange=true;
        1524: endif
      1525: endif
    1526: end do
  1527: end do
  1528: if (procChange) then
    1529: foreach callee $c_i$ of procedure n do
      1530: if $c_i$ is not marked as no-analyze then
        1531: add $c_i$ to WorkList;

1532: endif
1533: end do
1534: endif
1535: }

First, line 1502 checks if any caller of the procedure n is marked no-analyze. If so, each object node $o_i$ of the procedure that was previously marked arg_escape and each node reachable from $o_i$ is conservatively marked global_escape, in lines 1503 through 1507. No further processing is needed in this case, and so the procedure returns in line 1508. The remainder of the procedure handles the case when no caller of the procedure is marked no-analyze. For internal bookkeeping, line 1510 initializes the variable procChange to false. Loop 1511 iterates over each thread variable allocated in the procedure n. Loop 1512 iterates over each field,$f_k$, of the thread object $o_i$. If $f_k$ is not already marked global_escape and $f_k$ is used before $o_i$ is killed (which can be determined by standard data flow analysis), then line 1514 marks $f_k$ and nodes reachable from it as global_escape, and sets procChange to true. Loop 1518 iterates over each object variable node, $o_i$, in the connection graph that is marked arg_escape. Loop 1519 iterates over each equivalent object, $eo_i$ of $o_i$ over all call-sites in different callers of procedure n. Line 1520 checks if $eo_i$ is marked global_escape. In that case, if $o_i$ was not already marked global_escape, it is marked global_escape, and procChange is set to true, in Lines 1521 through 1524. Finally, line 1528 checks if there has been a change in the status of some variable in n (by checking the value of procChange). If there has been a change, lines 1529 through 1533 add all of the procedures called inside n, that are not marked no-analyze, to the work list, to ensure that those procedures will be analyzed again by AnalyzeThreadProcedure.

The Optimization of Simple Locking Operations Phase

The following pseudocode describes the process of step 204 of FIG. 2, removeSimpleLockOperations. The pseudocode describes how the program representation contained in G is transformed, using the results of the escape analysis process contained in G and the connection graph CG, The method for transforming the program takes as inputs G, which is an intermediate language representation of the program being optimized; M, the particular procedure being optimized (M is referred to by its signature, and may optionally be a devirtualized invocation), and CG, the connection graph containing the results of the Escape Analysis. These inputs are shown as arguments to the removeSimpleLockOperations algorithm in step 1901. It is initially invoked with M=MAIN.

1901: removeSimpleLockOperations(G, M, CG) {
  1902: GM=G(M)
  1903: M.nseRemoved=true
  1904: foreach node N in G do
    1905: if N.op is a procedure invocation then
      1906: $M_N$=N.procedure
      1907: if not $M_N$.nseRemoved then
        1908: removeSimpleLockOperations(G, $M_N$, CG)
      1909: endif
    1910: else
      1911: if N.op=$O_N$ and IsThreadLocal(N.obj,CG, N.stmt) then
        1912: removeLock($G_M$, N)
      1913: endif
    1914: endif
1915: }

In line 1902, $G_M$, the intermediate language form of the procedure to be transformed is accessed. Line 1903 updates the globally accessible data structure associated with the procedure M to indicate that it is being visited. Marking this structure allows the method to handle recursive routines by entering, and transforming them only once.

Line 1904 begins an iteration over each node of $G_M$. Each node is checked to see if it corresponds to a procedure invocation (step 1905) or some simple locking operation on an object that does not escape (step 1911). If the former, and if the procedure has not already been transformed (the check of line 1907), the procedure is transformed by recursively performing removeSimpleLockOperations (line 1908). If the latter, the program is transformed by removing the locking operation from the program. Thus, our invention uses information about the scope in which a lock is accessed in order to optimize it.

The Analysis of Side Effects Phase Side Effect Analysis

The sideEffectAnalysis process, as shown in FIG. 2, step 206, logically creates a table ($T_{sideEffects}$) with an entry for each node N in G, ,where N.op is a comprehensive locking operation. $T_{sideEffects}[N]$ is true if the side effects, of the locking operation at node N, must be performed. The table $T_{sideEffects}$ may be physically implemented as a table or hash table, or as a table whose entries are distributed among the nodes of the control flow graph for the method contained in G for which the table contains entries. The other transformation brought about by the analysis process is the addition of summary information, in the form of fields (or flags) KILL and GEN for each procedure M. These are described above in the discussion of line 205 of FIG. 2. These fields can take on the values true and false, and are attached to the label information in L for each procedure M in the intermediate representation of the program. The additional fields of information of a node in a method's control flow graph that are transformed by sideEffectsAnalysis, are read by the locking operation optimization routines.

The inputs to the process of sideEffectAnalysis are the intermediate program representation G; the procedure M being analyzed; the results of the Escape Analysis process in the connection graph CG; a flag IN which contains the initial value (true or false) for the analysis, and a flag OUT which represents summary information for the analysis as applied to IN. Below is pseudocode describing the method for sideEffectAnalysis.

2001: sideEffectAnalysis(G, M, CG, IN, OUT) {
  2002: $G_m$=G(M)
  2003: foreach node N $\in$ $G_m$ do
    2004: $N._{IN}$=false
    2005: $N._{OUT}$=false
    2006: if N.type$\neq$procedureCall then
      2007: $N._{GEN}$=false
      2008: $N._{KILL}$=true
      2009: if ($\exists$k s.t. $V_k \in$ N $\wedge V_k$.lval=true) $N._{GEN}$=true
      2010: if ((N.op=$O_S$) and (not inside exception block)) $N._{KILL}$=false

```
2011: else
   2012: M=N.procedure
   2013: if M.summarized then
      2014: N.GEN=M.GEN
      2015: N.KILL=M.KILL
   2016: else
      2017: if (M.visited) then
         2018: N.GEN=true
         2019: N.KILL=true
      2020: else
         2021:  summarizeMethodSideEffects(G, M,
            CG, N.GEN, N.KILL)
      2022: endif
   2023: endif
2024: enddo
2025: ENTRY.IN=IN
2026: C=true
2027: while(C=true) do
   2028: C=false
   2029: foreach node N in a traversal of G_M do
      2030: N.IN=-{OUT_P/P ∈ N.pred}
      2031: OUT_TEMP=N.OUT
      2032: N.OUT=(N.IN· N.KILL)-N.GEN
      2033: C=C-(OUT_TEMP≠N.OUT)
   2034: enddo
2035: enddo
2036: OUT=EXIT.OUT
2037: }
```

In line 2002, the portion of the intermediate representation that concerns the procedure (M) being analyzed is accessed. The loop from lines 2003 through 2024 sets up information at each node N in $G_M$ that tells what objects at the node N are affected by locking operation side effects (N.$_{GEN}$); and what objects' side effect requirements are provided for by the node (N.$_{KILL}$) Lines 2025 to 2035 takes the just-modified $G_M$ and determines for each node whose operation is a comprehensive locking operation whether there are any objects affected by the side effects of the locking operation. If not, it will not be necessary to perform the side effect, as discussed later when describing the effects of the process labeled 208 in FIG. 2. Line 2036 sets the OUT parameter to sideEffectsAnalysis to be the OUT value for the EXIT node of the method's control flow graph.

Lines 2004 and 2005 fill in default values for N.$_{IN}$, N.$_{OUT}$. Lines 2007 and 2008 set defaults for N.$_{GEN}$ and N.$_{KILL}$ when the node is not a procedure invocation. All but N.$_{KILL}$ are set to false, with N.$_{KILL}$ set to true. N.$_{IN}$ is set to false, indicating that none of the predecessors of the node in the program have operations on objects affected by comprehensive locking operations. N.$_{OUT}$ is initially set to false, indicating that no objects affected by locking operation side effects reach the end of the node. N.$_{GEN}$ is set to false, indicating no objects operations are performed in the node that require locking operation side effects. N.$_{KILL}$ is set to true, indicating that the node has no comprehensive locking operations. For nodes that have operations that make these flags inaccurate, more accurate information is computed. Otherwise, the default values make nodes for other operations act as identity functions on their inputs. Line 2009 updates the N.$_{GEN}$ flag if any global object is updated in this node, i.e. has any object operation that is affected by the next executed comprehensive locking operation. Line 2010 updates the N.$_{KILL}$ set to false if the node contains an $O_S$ operation, i.e. a comprehensive locking operation. This reflects the $O_S$ node performing the side effect for all previously written objects for which no other $O_S$ intervenes between the writing of the object and the execution of this $O_S$ statement.

Lines 2012 through 2023 handle the case where the node is a procedure invocation. In this situation, information that summarizes the effect of the entire procedure call is placed into the N.$_{GEN}$ and N.$_{KILL}$ structures. If an invocation of the procedure has already been visited at another node, and the required summary information is associated with the procedure M, this information is labeled M.$_{GEN}$ and M.$_{KILL}$ and is either copied to, or referenced as, N.$_{GEN}$ and N.$_{KILL}$. The check for the availability of the information occurs at line 2013, and the copying or referencing operation occurs at lines 2014 and 2015. If an invocation of the procedure has been visited in another node, but the summary information is not present, then the invocation at the current node N is a recursive invocation, and the previous invocation(s) have not yet completed. This is detected by the if statement at line 2017, in conjunction with the knowledge that the process is at the false branch of the if at line 2013. The process safely approximates the results of the analysis by setting N.$_{GEN}$ to true and N.$_{KILL}$ to true, indicating that all objects shown by the connection graph to be accessed in more than one thread have side effects that must be performed by $O_S$, and that no side effects prior to the procedure M call at node N are taken care of by any $O_S$ locking operation in the invocation of procedure M. Finally, line 2021, selected by the else at line 2020, is executed when no summary information is available and no invocation of the procedure has been previously encountered.

In this case, summarizeMethodSideEffects, described in pseudocode and discussed below, is invoked with arguments G, M, CG, N.$_{GEN}$ and N.$_{KILL}$. summarizeMethodSideEffects, using the procedure M, the program representation in G, and the connection graph information for each object containing the results of the escape analysis step, transforms the structures for procedure M to have summary information, and updates N.$_{GEN}$ and N.$_{KILL}$ to also have that information.

Lines 2025 through 2035 propagate the information at each node through the representation of the procedure being analyzed. This is done by repeatedly traversing the intermediate representation of the procedure M($G_M$), annotated with the node summary information (N.$_{KILL}$ and N.$_{GEN}$), until no changes are made in a traversal (C=false). The repetition of the traversal is done by the loop at line 2027, and the traversal itself is done in the loop beginning at line 2029. Lines 2030 through 2033 are performed on each node N visited in the traversal. At line 2030, information, about all objects affected by a comprehensive locking operation are gathered from all nodes that might immediately precede the current node in some execution of the program, and stored in N.$_{IN}$. N.$_{OUT}$, the current information about all objects affected by a comprehensive locking operation after the execution of node N is saved in OUT$_{TEMP}$ by line 2031. Line 2032 then computes a new value for N.$_{OUT}$ by removing from N.$_{IN}$ all objects whose side effect requirements are handled by node N, and adding to it all objects which are affected by a locking operation's side effects because of operations within node N. Finally, in line 2033, we compare OUT$_{TEMP}$ with the newly computed value of N.$_{OUT}$. If they are different, then C is set to true to indicate that a change has occurred in this traversal. Line 2035 returns the value of the EXIT node OUT field through the OUT parameter; this serves as a summary of the entire method.

Below is pseudocode describing the method for summarizeMethodSideEffects called in line 2021, above.

```
2101: summarizeMethodSideEffects(G, M, CG, GEN,
      KILL) {
2102:   M.visited=true
2103:   G_M=G(M)
2104:   if G_M=null then
2105:     GEN=true
2106:     KILL=true
2107:   else
2108:     sideEffectsAnalysis(G, M, CG, false, GEN)
2109:     sideEffectsAnalysis(G, M, C, CG, true, KILL)
2110:   endif
2111:   M._GEN=GEN
2112:   M._KILL=KILL
2113:   M.summarized=true
2114:   M.visited=false
2115: }
```

Routine summarizeMethodSideEffects is invoked on methods whose intermediate representation is contained in G. It transforms the information on methods in G to have summary GEN and KILL information for each procedure, as well as setting a flag, in G, indicating for each procedure if the procedure has valid GEN and KILL summary information.

The summary information for GEN is true if any operations on any object in M require that the side effects of the next comprehensive locking operation to be executed must be performed. Furthermore, there is some path through M such that no comprehensive locking operation is executed between the operation on the object and an exit from M. It is false otherwise.

The summary information for KILL is true if either GEN is true, or if some object operation prior to the invocation of M requires that the side effects of the next comprehensive locking operation to be executed be performed, and that, furthermore, there is some path through M such that no such comprehensive locking operation is performed.

As shown in line 2101, the information used to compute this is G, M, CG, with GEN and KILL information passed out to the side effect analysis algorithm. In line 2102, M.visited is set to true to indicate that M is currently being analyzed. Line 2103 extracts the intermediate program representation from G. Lines 2105 through 2106 compute conservative information if the procedure is not available. The if at line 2104 determines whether this is necessary.

Line 2108 computes summary GEN information by recursively invoking sideEffectAnalysis (described at line 2001) with IN=false. If OUT=true is returned from sideEffectAnalysis, then GEN is set to true, indicating that some object operation in M requires that the next comprehensive locking operation execute its side effects, and that some path exists from the object operation to an exit from sideEffectAnalysis without encountering such a locking operation.

Line 2109 computes summary KILL information by recursively invoking sideEffectAnalysis (described above) with IN=true. If OUT=true, then either there is a path from the ENTRY node of M to its EXIT node such that no comprehensive locking operation exists, or there is a path from some operation on an object within M, that requires that the next comprehensive locking operation perform its side effects, to an exit of M, such that no such comprehensive locking operation exists on the path.

Lines 2113 sets the flag for M indicating that the GEN and KILL information has been computed. Line 2114 sets M's visited flag to false indicating that we are no longer analyzing M.

The Optimization of Comprehensive Locking Operations Phase

Below is pseudocode describing the method of step 208 in FIG. 2, for optimizeComprehensiveLockOperations.

```
2201: optimizeComprehensiveLockOperations(G, M, CG) {
2202:   G_M=G(M)
2203:   M._seOptimized=true
2204:   foreach n ∈aQ G_M do
2205:     if N.op is a procedure invocation then
2206:       M_N=N.procedure
2207:       if not M_N.seOptimized then
2208:         optimizeComprehensiveLockOperations
                (G, M_N, CG)
2209:       endif
2210:     else
2211:       if N.op=O_S then
2212:         if not IsThreadLocal(N.obj, CG, N.stmt)
                then
2213:           if N._IN=false then
2214:             makeLockSimple(G_M, N)
2215:           endif
2216:         else
2217:           if N._IN=true then
2218:             makeLockSideEffectOnly (G_M, N)
2219:           else
2220:             makeLockNull(G_M, N)
2221:           endif
2222:         endif
2223:       endif
2224:     endif
2225: }
```

This routine takes as inputs G, M, and CG and produces a transformed program by modifying the representation $G_M$ of the procedure M in the intermediate language of the compiler by optimizing the comprehensive locking operations, where possible, while maintaining the semantics of the original program.

Line 2202 extracts the intermediate representation of the procedure to be optimized. Line 2203 marks that the procedure has been optimized using the transformation of optimizeComprehensiveLockOperations.

The loop at line 2204 visits each node in $G_M$ in turn. At line 2205, it is determined if the node is a procedure invocation. If so, and if the procedure is not already optimized or being optimized for comprehensive locking operations (this test is done by line 2207) the method's handle in G (extracted in line 2206) is passed to a recursive call to optimizeComprehensiveLockOperations in line 2208 to optimize the procedure.

The case where the node in $G_M$ is not a procedure invocation is handled in lines 2211 through 2220. If the node is an $O_S$ operations (line 2211), but the locking operation is on an object that escape (line 2212) and there are no objects requiring side effects (line 2213), the operation $O_S$ is replaced with an operation $O'_S$ that transforms the comprehensive locking operation to a simple locking operation (line 2214). The locking operation would in this case would only perform the synchronization operations necessary to ensure mutual exclusion, and not perform any side effects.

If the node is an $O_S$ operation, but the object being locked does not escape (line 2216), but there are side effects (the if at line 2217 is true), the $O_S$ operation is replaced with a fence (sometimes called a sync) operation that performs the side effect part of the locking operation (line 2218). Note that in this case, the synchronization operation to ensure mutual exclusion is recognized as unnecessary, and eliminated.

If object being locked does not escape, and the side effects of the locking operation are not needed, it can be removed, as done by line 2220. A practitioner skilled in the art will realize that this has the effect of a "no-op," therefore the effect of makeLockNull can be to emit no code at all for the locking operation. This is true whether the program is being compiled by a static or dynamic compiler.

The actual implementation of the optimization of locking operations can be performed by a static compiler, a dynamic compiler, or by the run-time system performing the locking operation, based on the analysis performed by the compiler.

The final transformed program resulting from the method of this invention can be fed into other phases of a compiler, programming environment or program development tool, as shown in FIG. 1, step 108, for further manipulation, or it can be stored into a file for later retrieval, analysis or processing.

Variants of Escape Analysis

In addition to the preferred embodiment as described above, various modifications are now described. The following variants of the preferred embodiment of the Escape Analysis generally simplify this analysis phase and make it more efficient either in speed and/or memory usage, but some variants may also lead to less precise results. For example, in the Escape_Analysis process, lines 308 through 312 can be omitted, and instead of those steps, each variable of the type arg_escape can be marked global_escape, so that at the end of AnalyzeProgram, only variables of the type procedure_local are viewed as thread-local. This variant simplifies the compiler analysis and makes the analysis more efficient.

In another possible embodiment, the compiler may not perform iterations over the procedures involved in a cycle in the call graph, as performed in Loop 308 and/or Loop 313, above, until the solution converges (i.e., until there is no change to the computed solution). Instead, the compiler may impose an upper limit on the number of times that a procedure is analyzed, and in the presence of cycles in the call graph, if the solution has not converged yet, may use conservative analysis, such as marking variables corresponding to actual parameters and return values as global_escape. This variant simplifies the compiler analysis and makes the analysis more efficient.

Similarly, in another embodiment, the cycles in the control flow graph may be handled differently than in the preferred method, shown in Loop 411 above. Again, an upper limit may be imposed on the number of times that a basic block is analyzed, and if a converged solution is not obtained while adhering to that limit, a more conservative solution might be used instead. This variant simplifies the compiler analysis and makes the analysis more efficient.

In other embodiments, the compiler may choose not to build a complete call graph of the program, or equivalently, regard many procedures in the call graph as no-analyze. This may be done due to the code for the procedure being unavailable, or to make analysis faster, or to avoid problems with binary compatibility of the generated code. In an embodiment that represents one extreme of this variation, the compiler, may choose not to do any interprocedural analysis, and regard each procedure called inside the current procedure as no-analyze, and assume conservative information at the call site. As an example of another embodiment that represents a less extreme version of this variation, a run-time compiler, with more constraints or compilation time, may decide to do detailed analysis of only selected parts of the program where it is spending a fair amount of time during execution. Those procedures, in which the program does not spend much time, may be marked no-analyze and conservative information may be used (similar to the way the preferred method handles procedures marked no-analyze in line 403) at call sites to those procedures.

In yet another embodiment, a "flow-insensitive" version of the method described in AnalyzeStackProcedure (which those skilled in the art would recognize as a "flow-sensitive method") may be used. In this embodiment, no killing of data flow information (represented by the bypassing and deletion of previous connection graph edges in Lines 712 through 714, above, and lines 815 through 817, above) is performed. Furthermore, there is no need to have different nodes in the connection graph for the same pointer variable in this embodiment. This variant simplifies the compiler analysis and makes the analysis more efficient.

In another embodiment, when a node is just marked global_escape, the method would not eagerly mark each node reachable from it as global_escape, as done in procedure MakeBottom, called on lines 720, 824 and 1006. Instead, the act of marking each node reachable from a global_escape node as global_escape would be deferred until the connection graph is summarized for the procedure. Those skilled in the art would recognize this as a lazy variant of this step in the preferred embodiment. On the other hand, in another embodiment, a node that is reachable from a formal parameter node of the procedure may be marked arg—escape eagerly, instead of being marked arg_escape when the connection graph is summarized for the procedure, as in Line 1305.

In another embodiment, a different method may be used to determine whether the connection graph has changed. Instead of using the method shown in lines 1401 to 1413, each time a new edge is added or the state of a node is changed (for example, from procedure_local to global_escape), a flag may be set to indicate that the connection graph has changed.

In another embodiment, the fields of a thread object may be conservatively marked global_escape as well. In that case, the lines 1511 through 1517 and the lines 1525 through 1532, above, would not be needed. This variant simplifies the compiler analysis and makes the analysis more efficient.

In other embodiments, separate nodes may not be used for all different fields of an object variable. At one extreme, in an embodiment, each field of an object may be represented by the node for the object itself. In another embodiment representing a less extreme position, multiple fields of an object may be represented by a single node. The variations reduce the space requirements of the method and make it faster than the method in the preferred embodiment, but the analysis also becomes more conservative.

On the other hand, this variant of the preferred embodiment is used to make the analysis more precise. In this variant, "type" information may be used to refine the connection graph information when compiling a language that is "type-safe", such as Java™. For instance, at a call-site to a procedure which is regarded as no-analyze, less conservative information may be used than that shown in AnalyzeStackProcedure in lines 402 to 407. This embodiment would only allow connections to parameters and return value nodes that are allowed by the type system. A deferred edge is allowed only from a variable that points to type $T_1$ to another variable that points to type $T_2$ if the type system allows a variable of type $T_1$ to be assigned to another variable of type $T_2$. A points-to edge is allowed only from a variable that points to type $T_1$ to another variable of type $T_2$ if the type system allows a variable of type $T_1$ to be assigned to another variable of type $T_2$. A field edge is allowed from a variable of type $T_1$ to variable of type $T_2$ if under the type system, $T_1$ has a member of type $T_3$ and if a variable of type $T_3$ may be assigned to another variable of type $T_2$.

In another embodiment, the compiler may not actually use a connection graph data structure—it may use a different representation, for example, lists, to maintain information about connections between variables.

One skilled in the art would recognize that other methods of analysis could be used in the practice of the present invention. For instance, the compiler may use pointer analysis to identify thread-local variables. Pointer analysis obtains information on the set of variables that each pointer variable points to. By marking each variable corresponding to a thread-escaping variable as global_escape, and by further marking each variable which can be pointed to from a global_escape variable as global_escape, a compiler can identify those variables that are not marked global_escape as thread-local.

Variants of Methods for Reducing and Simplifying Locking Operations

In other possible embodiments of this invention, the optimization of the locking operation may be performed by the run-time implementation of the locking operation rather than the (static or dynamic) compiler. In this variant, the transformation of a locking operation to a simple locking operation is done as follows. The locking operation is passed two pieces of information, preferably in only two bits. The first bit is true if the object does not escape the thread, and is information provided by escape analysis. If the object does escape, this bit is set to false. The second bit is true if the locking operation should perform the side effects, and is false otherwise. The locking operation can read these bits to determine what actions it should take. When generating code, either in the context of a static compiler or a dynamic compiler, these bits are set appropriately for the operations to be performed. The default for a comprehensive locking operation would be to set both bits to true. One skilled in the art will realize that these bits could also be carried along in the object, and set appropriately, and then reset to true, true (for a comprehensive locking operation) or true, false (for a simple locking operation), before and after each optimized locking operation. One skilled in the art will also realize that a straightforward data flow analysis can reduce the number of setting and resettings of these bits, whether in or outside of an object, by determining when a bit will have the same value at dynamically adjacent locking operations.

In the case of makeLockSimple on line 2214, the first bit is set to true, and the second is set to false. The locking operation would in this case would only perform the synchronization operations necessary to ensure mutual exclusion, and not perform any side effects. In the case of makeLockSideEffectOnly on line 2218, the bits are set to false and true, respectively, and the locking operation will not perform the synchronization necessary to ensure mutual exclusion. Again, if the bits are contained in the object itself, they will be reset after the locking operation, as described above. In the case of makeLockNull (on line 2220), both of the bits are set to false and false, and the locking operation need not perform any synchronization operation to ensure mutual exclusion or the side effects.

Reducing and Simplifying Locking Operations In Programs with Comprehensive Locking Operations and Simple Locking Operations, by Removing Where Possible Simple Locking Operations, And by Transforming to Simple Locking Operations, Where Possible, Comprehensive Locking Operations An embodiment of this variant of the invention is shown in pseudocode below.

```
2301: lockOpt2(G, CG) {
  2302: EscapeAnalysis(G, CG)
  2303: removeSimpleLockOperations(G, M=MAIN, CG)
  2304: optimizeComprehensiveLockOperations2 (G, M=MAIN, CG)
2305: }
```

This variant differs from the method of the previous section, described in FIG. 2, in the optimization of comprehensive locking operations. In the method described in the previous section, comprehensive locking operations performed on objects locked in a single thread, and whose side effects are not necessary to preserve the semantics of the program, are removed. In this variant, these locking operations are not removed, but replaced with a simpler locking operation which performs the side effects but does not perform the actual locking operation.

The differences are shown above in the lockOpt2 routine at lines 2301 to 2305 and below in the optimizeComprehensiveLockOperations2 routine at lines 2501 to 2517.

The lockOpt2procedure differs from the method of FIG. 2 first in that the side effect analysis procedure of line 206 is not performed in the variant. This step is not necessary for the current method because comprehensive locking operations are treated the same whether their side effects affect the correctness of the program or not. The second difference is the procedure called to transform the program. In the method of FIG. 1, the procedure optimizeComprehensiveLockOperations as shown above is invoked, and in lockOpt2, the procedure of optimizeComprehensiveLockOperations2, shown below, is invoked. The differences between the procedures of optimizeComprehensiveLockOperations and of optimizeComprehensiveLockOperations2 can be seen by comparing lines 2217 through 2221 and line 2513. In line 2513, the locking operation is simplified regardless of whether its side effects are necessary.

```
2501: optimizeComprehensiveLockOperations2(G, M, CG)
  {
  2502: G_M=G(M)
  2503: M.seOptimized=true
  2504: foreach N ∈ G_M do
    2505: if N.op=procedure invocation do
      2506: M_N=N.procedure
      2507: if not M_N.seOptimized do
        2508: optimizeComprehensiveLockOperations2
              (G, M_N, CG)
      2509: endif
    2510: else
      2511: if N.op=O_S then
        2512: if notmayEscapeThread(CG, N.obj, N.stmt) then
          2513: makeLockSideEffectOnly(G_M, N)
        2514: endif
      2515: endif
    2516: endif
2517: }
```

Optimizing Locking Operations in Programs with Comprehensive Locking Operations and Simple Locking Operations, by Removing, Where Possible, Either Kind of Locking Operations An embodiment of this variant of the first described aspect of the invention is shown in lockOpt3, below in lines 2401 to 2406.

```
2401: lockOpt3 (G, CG) {
  2402: EscapeAnalysis(G, CG)
  2403: removeSimpleLockOperations(G, M=MAIN, CG)
  2404: sideEffectAnalysis(G, M=MAIN, CG, IN_{MAIN}=
        false, OUT_{MAIN})
  2405: optimizeComprehensiveLockOperations3 (G,
        M=MAIN, CG)
  2406: }
```

This variant differs in the optimization of comprehensive locking operations. In the first embodiment, described previously, comprehensive locking operations performed on objects locked in a single thread, and whose side effects are not necessary to preserve the semantics of the program, are removed, and locking operations with whose side effects are necessary to preserve the semantics of the program are simplified. In this variant, the comprehensive locking operations whose side effects are necessary to preserve the semantics of the program are not simplified.

The differences are shown in lockopt3 lines 2401 to 2406, above, and optimizeComprehensiveLockOperations3 lines 2601 to 2620, below.

```
2601: optimizeComprehensiveLocksOperations3(G, M, CG) {
  2602: G_M=G(M)
  2603: M._{seOptimized}=true
  2604: foreach N c G_M do
    2605: if N.op=procedure invocation then
      2606: M_N=N.procedure
      2607: if not M_N.seOptimized then
        2608: optimizeComprehensiveLocksOperations3
              (G, M_N, CG)
      2609: endif
    2610: else
      2611: if N.op=O_S then
        2612: if not mayEscapeThread(CG, N.obj,
              N.stmt) then
          2613: if N._{IN}=false then
            2614: makeLockNull(G_M, N)
          2616: endif
        2617: endif
      2618: endif
    2619: endif
  2620: enddo
2621:}
```

The process described in FIG. 2 differs from the process described in the procedure called to transform the program for optimizing comprehensive locking operations. In previous embodiment, the procedure of optimizeComprehensiveLockOperations is invoked, and in this variant, the procedure of optimizeComprehensiveLockOperations3 is invoked. The differences between these procedures can be seen by comparing lines 2211 through 2219 and lines 2611 through 2615. In line 2611, it is determined that the locking operation is a comprehensive locking operation. In lines 2612 and 2613, it is determined that the object on which the locking operation is performed is not locked in another thread, and that the side effects of this locking operation do not need to be performed to ensure the correctness of the program. Finally, in line 2614, the locking operation is optimized, as described previously. In optimizeComprehensiveLockOperations the corresponding code (lines 2211 through 2219) also check for the cases here the locking operation is not needed but the sides effects are, and the case where the locking operation is not needed, but the side effects are.

Optimizing Locking Operations in Programs with Simple Locking Operations by Removing, there Possible, Simple Locking Operations An embodiment of this variant of the first described embodiment of the invention is shown in lockOpt4, below.

```
2701: lockOpt4(G, CG) {
  2702: EscapeAnalysis(G, CG)
  2703: removeSimpleLockOperations(G, M=MAIN, CG)
  2704: }
```

This variant differs in the optimization of comprehensive locking operations. In the previously described method, comprehensive locking operations were considered when performing optimizations. In this method, comprehensive locking operations are not considered, and no attempt is made to analyze or optimize them.

The differences are shown in the process of lockOpt4, above. The process differs from that of the method of FIG. 2 in that the program analysis of line 206 is not performed to analyze the program, and line 208 is not performed to transform the program. Lines 2702 and 2703 of lockOpt4 and steps 202 and 204 of the method of FIG. 2 perform the same processes, described in the first embodiment of the invention, and discussed previously. In lockOpt4, line 2702 performs escape analysis to determine which objects may have locking operations performed on them in more than one thread, and line 2703 transforms the input program by removing simple locking operations that are performed on locks that are locked in at most one thread.

Optimizing Locking Operations in Programs with Comprehensive Locking Operations, by Removing, Where Possible, Comprehensive Locking Operations; and Transforming the Comprehensive Locking Operations That Cannot Be Removed Into a Simple Locking Operation An embodiment of this variant of the invention is shown in lockOpt5, below.

```
2801: lockOpt5(G, CG) {
  2802: EscapeAnalysis(G, CG)
  2803: sideEffectAnalysis(G, M=MAIN, CG, IN_{MAIN}=
        false, OUT_{MAIN})
  2804: optimizeComprehensiveLockOperations(G,
        M=MAIN, CG)
  2805: }
```

This variant differs from the previously described first embodiment in the optimization of simple locking operations. In particular, step 204 of the process described above is not performed in the process described by lockOpt5. That step removes simple locking operations whenever the object being locked by that operation is locked by at most one thread.

Line 2803 of this method performs the analysis to determine which comprehensive locking operations must perform their side effects. The analysis is shown in more detail in the procedure sideEffectAnalysis at lines 2001 to 2036, and previously discussed in more detail above. Line 2804 of this method invokes the process to transform the program by removing comprehensive locking operations whose side effects and locking operation are both not needed, and simplifying the remaining locks where shown to be possible by the analysis of lines 2803 and 2804. The process of line 2804 is shown in more detail in optimizeComprehensiveLockOperations at lines 2201 to 2225, and discussed above.

Optimizing Locking Operations in Programs Having Comprehensive Locking Operations, by Simplifying the Comprehensive Locking Operations So as to Only Perform a Simple Locking Operation An embodiment of this variant of the first described embodiment of the invention is shown in lockOpt6, below.

```
2901: lockOpt6(G, CG) {
  2902: EscapeAnalysis(G, CG)
  2903: optimizeComprehensiveLockOperations2(G,
      M=MAIN, CG)
  2904: }
```

This variant differs from the previously described method in the optimization of simple locking operations. In particular, the process of line 2803 of the process described above in lockOpt5 is not performed in the process described by lockOpt6 2903 the process optimizeComprehensiveLockOperations2 described above. This process does not remove the comprehensive locking operations, but only simplifies them by reducing them to a simple locking operation.

Optimizing Locking Operations in Programs with Comprehensive Locking Operations, by Removing the Comprehensive Locking Operations When Doing So Does Not Affect the Semantics of the Program Being Transformed An embodiment of this variant of the method is shown in lockOpt7, below.

```
3001: lockOpt7(G, CG) {
  3002: EscapeAnalysis(G, CG)
  3003: sideEffectAnalysis(G, M=MAIN, CG, IN_{MAIN}=
      false, OUT_{MAIN})
  3004: optimizeComprehensiveLockOperations3(G,
      M=MAIN, CG)
  3005: }
```

This variant differs in the optimization of comprehensive locking operations that can be transformed to simple locking operations but not removed. In particular, the process of line 2803 of the process described by lockOpt5, above, is not performed in the process described by lockOpt7. Instead, the present method performs for line 2803 the optimizeComprehensiveLockOperations3 process shown in pseudocode below. This process only optimizes comprehensive locking operations that can be removed.

Optimizing Locking Operations in Programs Having Comprehensive Locking Operations, by Transforming the Comprehensive Locking Operations to Simple Lock Operations An embodiment of this variant of the invention is shown below in lockOpt8.

```
3101: lockOpt8(G, CG) {
  3102: sideEffectAnalysis(G, M=MAIN, CG, IN_{MAIN}=
      false, OUT_{MAIN})
  3103: optimizeComprehensiveLockOperations8(G,
      M=MAIN, CG)
  3104: }
```

This process differs in the optimization of comprehensive locking operations. In particular, the process used by the embodiment in line 2802 (the escape analysis) of the lockOpt5 process described above is not performed in this variant process. Thus, no escape analysis is performed in this variant on the method. As well, the process of line 2804 (locking operation optimization) is not performed in this variant process, either. Instead, the present method performs for step 2804 the process described above, and does not remove the comprehensive locking operations, but only transforms them to a simple locking operation. This process is now described.

The process is shown as the procedure optimizeComprehensiveLocksOperations8, as shown below.

```
3201: optimizeComprehensiveLockOperations8(G, M, CG)
{
  3202: G_M=G(M)
  3203: M._{seOptimized}=true
  3204: foreach N c G_M do
    3205: if N.op=procedure invocation then
      3206: M_N=N.procedure
      3207: if not M_{N.seOptimized} then
        3208: optimizeComprehensiveLockOperations8
            (G, M_N, CG)
      3209: endif
    3210: else
      3211: if N.op=O_S then
        3212: if N.IN=false then
          3213: N.op=O_N
        3214: endif
      3215: endif
    3216: endif
  3217: }
```

This process differs from optimizeComprehensiveLockOperations3, discussed previously in the following way. In line 2512, a node that performs a comprehensive locking operation is checked to determine if the object being locked is accessed outside the thread. In the current method, a node performing a comprehensive locking operation is checked to see if any side effects are required (in line 3212). No check is made to determine the scope of accesses to the object being locked. In line 2513, the locking operation is replaced with an operation that only performs the side effect if the above determination is made. In the process of the current method, the comprehensive locking operation is only transformed to a simple locking operation (when possible to do so without changing the semantics of the original program), and therefore does not perform the side effects. This is done in line 3113.

While the invention has been described in terms of a single preferred embodiment, with several variants, those skilled in the art will recognize that the invention can be practiced with modification within the spirit and scope of the appended claims.

REFERENCES

[1] Sarita V. Adve and Mark D. Hill, "Weak Ordering, A New Definition," *Proceedings of the* 1990 *International Symposium on Computer Architecture* (ISCA), June, 1990.

[2] David R. Butenhof, "Programming With Posix Threads" (*Addison Wesley Professional Computing Series*), Addison-Wesley Publishing Company, Reading, Mass.

[3] P. Diniz and M. Rinard, "Lock-Coarsening: Eliminating Lock Overhead in Automatically Parallelized Object-Based Programs," *Proceedings of the 9th Workshop on Languages and Compilers for Parallel Computing*, San Jose, Calif., August 1996.

[4] P. Diniz and M. Rinard, "Synchronization Transformations for Parallel Computing," *Proceedings of 24th SIGPLAN-SIGACT Symposium on Principles of Programming Languages*, Paris, France, January 1997.

[5] Perry E. Emrath, Sanjoy Ghosh and David Padua, "Detecting Nondeterminacy in Parallel Program," *IEEE Software*, Vol. 9, No. 1, pages 69–77, Jan. 1, 1992.

[6] Zhixi Fang, Peiyti Tang, Pen-Chung Yew and Chuan-Qi Zhu, "Dynamic Processor Self Scheduling for General Parallel Nested Loops," *IEEE Transactions on Computers*, Vol 39, No. 7, pages 919–929, July 1990.

[7] James Gosling, Bill Joy and Guy L. Steele, Jr., "The Java Language Specification" (Java Series), Addison-Wesley Publishing Company, Reading, Mass.

[8] Manish Gupta and Edith Schonberg, "Static Analysis to Reduce Synchronization Costs in Data-Parallel Programs." *Proceedings of 23rd SIGPLAN-SIGACT Symposium on Principles of Programming Languages*, St. Petersburg, Fla., January 1996.

[9] Z Li and Walid Abu-Sufah, "On Reducing Data Synchronization in Multiprocessed Loops," *IEEE Transactions on Computers*, Vol C-36, pages 105–109, No. 1, January 1987

[10] Samuel P. Midkiff and David A. Padua, "Compiler Algorithms for Synchronization," *IEEE Transactions on Computers*, Vol. 36, No. 12, pages 1485–1495, December 1987.

[11] M. O'Boyle and F. Bodin, "Compiler Reduction of Synchronization in Shared Virtual Memory Systems," *Proceedings of 9th ACM International Conference on Supercomputing*, Barcelona, Spain, July 1995.

[12] H. M. Su and P. C. Yew, "On Data Synchronization for Multiprocessors", *ACM Proceedings of the 16th International Symposium on Computer Architecture*, 1989, pp 416–423.

[13] C. -W. Tseng, "Compiler Optimizations for Eliminating Barrier Synchronization," *Proceedings of 5th ACM Symposium on Principles and Practices of Parallel Programming*, Santa Barbara, Calif., July 1995.

Having thus described our invention, what we claim as new and desire to secure by letters patent is as follows:

1. A method for optimizing the locking operations in a computer program said method comprising the steps:
   (a) classifying a state of all variables involved in locking operations in the computer program as either "global_escape" or "thread-local"; and
   (b) transforming said program by removing all simple locking operations which are on variables having a state of "thread-local",
   wherein the strict semantics of the computer program are preserved.

2. A method for optimizing the locking operations in a computer program as recited in claim 1, wherein the step of classifying a state of all variables involved in locking operations in a program as either "global_escape" or "thread-local" is performed interprocedurally for the complete said program, where some procedures of said program cannot or should not be analyzed by a compiler.

3. A method for optimizing the locking operations in a computer program as recited in claim 2, wherein "type" information about program variables is used to improve the quality of information about whether the variable being locked has a state of "global_escape" or "thread-local" for all locks in a procedure of said program, wherein said procedure is not analyzed by a compiler.

4. A method for optimizing the locking operations in a computer program as recited in claim 1, wherein the step of classifying locked variables as having a state of either "global_escape" or "thread-local" correctly handles exceptions in a program by selectively modifying information about precious connections of program variables.

5. A method for optimizing the locking operations in a computer program as recited in claim 1, wherein the optimization of locking operations are selectively performed in a run-time system implementing locking operations, using information about whether the variable being locked has a state of "global_escape" or "thread-local", said information being generated by a compiler.

6. A method for opting the locking operations in a computer program as recited in claim 1, further comprising the step (c) of transforming the program by simplifying each comprehensive locking operation that is on a variable having a state of "thread-local" by removing mutual exclusion.

7. A method for optimizing the locking operations in a computer program as recited in claim 1, further comprising the steps:
   (c) determining all actions of the program that require the side effects of some comprehensive locking operation to be performed to preserve the semantics of said program; and
   (d) transforming said program by removing from said program any comprehensive locking operation that is on a variable having a state of "thread-local", and whose side effects are not necessary, as determined in step (c), to preserve the correct semantics of said program.

8. A method for optimizing the locking operations in a computer program having locks in single threads and multiple threads, wherein some locking operation semantics are comprehensive locks with side effects, and other locking operation semantics are simple locks without side effects, while preserving the semantics of the program, said method comprising the steps:
   (a) determining the scope of access of all locks involved in locking operations in a program; and
   (b) transforming said program by removing all simple locking operations which are on objects that are accessed in only a single thread,
   wherein the step of determining the scope of access of all locks involved in locking operations in a program is performed interprocedurally for the complete said program, where some procedures of sad program cannot or should not be analyzed by a compiler, and wherein the step of determining the scope of access of all locks interprocedurally for a computer program summarizes the effects of invoking a first procedure for different calling contexts using a single summary representation, further comprising the steps of:
      (a) creating phantom nodes to represent the locks that are accessed in said first procedure, or any other procedure that is called, directly or indirectly, by said first procedure, but created neither in said first procedure nor in any procedure transitively invoked by said first procedure;
      (b) using a return value, formal parameters, said phantom nodes, and locks accessed transitively within said first procedure to determine the effects of invoking said first procedure on the scope of access of all locks;
      (c) summarizing said determined effects of invoking said first procedure on the scope of access of all locks in terms of said return value and said formal parameters of said first procedure;
      (d) determining the scope of access of all locks at each calling context of said first procedure by matching the locks reachable from said return value or actual parameters of said first procedure with the locks reachable from said return value or said formal parameters, all at said calling context corresponding to the return value or the actual parameters of said first procedure.

9. A method for optimizing the locking operations in a computer program having locks in single threads and multiple threads, wherein some locking operation semantics are comprehensive locks with side effects, and other locking operation semantics are simple locks without side effects, while preserving the semantics of the program, said method comprising the steps:

(a) determining the scope of access of all locks involved in locking operations in a program;

(b) transforming said program by removing all simple locking operations which are on objects that are accessed in only a single thread;

(c) determining all actions of said program that require side effects of a comprehensive locking operation to be performed to preserve the semantics of the program; and (d) transforming said program comprising the steps:
  (i) simplifying each comprehensive locking operation by replacing with a more efficient operation all comprehensive locking operations that are on an object that is locked only within a single thread but whose side effects are necessary, as determined in step (c), to preserve the correct semantics of said program;
  (ii) simplifying each comprehensive locking operation by replacing with a more efficient operation all comprehensive locking operations that are on an object that is locked in multiple threads, but whose side effects are not necessary, as determined in step (c), to preserve the correct semantics of said program; and
  (iii) removing from the program any comprehensive locking operation that are on an object that is locked only within a single thread, and whose side effects are not necessary, as determined in step (c), to preserve the correct semantics of said program, wherein the step of determining the scope of access of all locks involved in locking operations in a program is performed interprocedurally for the complete said program, where some procedures of said program cannot or should not be analyzed by a compiler.

10. A method for optimizing the locking operations in a computer program as recited in claim 7, wherein the optimization of simplifying comprehensive locking operations is selectively performed in a run-time system implementing locking operations, using information about the side effects of locking operations, said information being generated by a compiler.

11. A method for optimizing the locking operations in a computer program having locks in single threads and multiple threads, while preserving the semantics of the program, said method comprising the steps:

(a) determining the scope of access of all locks involved in locking operations in a program;

(b) determining all actions of said program that require the side effects of some comprehensive locking operation to be performed to preserve the semantics of said program; and (c) transforming said program comprising the steps:
  (i) simplifying each comprehensive locking operation by replacing with a more efficient operation all comprehensive locking operations that are on an object that is locked only within a single thread but whose side effects are necessary, as determined in step (b), to preserve the correct semantics of said program;
  (ii) simplifying each comprehensive locking operation by replacing with a more efficient operation all comprehensive locking operations that are on an object that is locked in multiple threads, but whose side effects are not necessary, as determined in step (b), to preserve the correct semantics of said program; and
  (iii) removing from the program any comprehensive locking operation that are on an object that is locked only within a single thread, and whose side effects are not necessary, as determined in step (b), to preserve the correct semantics of said program.

12. A method for optimizing the locking operations in a computer program having locking operations on variables, while preserving the semantics of the program, said method comprising the steps:

a. determining whether the variable being locked has a state of "global_escape" or "thread-local" for all locking operations in a program; and b. transforming said program by simplifying all comprehensive locking operations that are on a variable having a state of "thread-local" by removing the locking, or primary, part of the locking operation.

13. A method for optimizing the locking operations in a computer program having locking operations on variables, a state of said variable being either "global_escape" or "thread-local", while preserving the semantics of the program, said method comprising the steps:

(a) determining whether the variable being locked has a state of "global_escape" or "thread-local" for all locking operations in a program;

(b) determining all actions of said program that require the side effects of some comprehensive locking operation to be performed to preserve the semantics of the program; and (c) transforming the program by removing from said program any comprehensive locking operation that is on a variable having a state of "thread-local", and whose side effects are not necessary, as determined in step (b), to preserve the correct semantics of the program.

14. A method for optimizing the locking operations in a computer program having locking operations on variables, a state of said variable being either "global_escape" or "thread-local", while preserving the semantics of the program, said method comprising the steps:

a. determining all actions of said program that require the side effects of some comprehensive locking operation on a variable to be performed to preserve the semantics of said program; and b. transforming the program by simplifying all comprehensive locking operations with unnecessary side effects by removing the side effects part of the locking operation, wherein said determining and transforming steps are independent of said state of said variable.

15. A machine readable medium containing code for optimizing the locking operations in a computer program having locking operations on variables, a state of said variable being either "global_escape" or "thread-local", while preserving the semantics of the program, the code implementing the steps of:

(a) determining for all locking operations in a program whether the variable being locked is "global_escape" or "thread-local"; and (b) transforming said program by removing all simple locking operations which are on variables having a state of "thread-local".

16. A machine readable medium containing code for optimizing the locking operations in a computer program having locks in single treads and multiple threads, wherein some locking operation semantics are comprehensive locks with side effects, and other locking operation semantics are simple locks without side effects while preserving the semantics of the program, the code implementing the steps:

(a) determining the scope of access of all locks involved in locking operations in a program; and (b) transform said program by removing all simple locking operations which are on objects that are accessed in only a single thread;

(c) determining all actions of said program that require side effects of a comprehensive locking operation to be performed to preserve the semantics of the program; and (d) transforming said program comprising the steps:
  (i) simplifying each comprehensive locking operation by replacing with a more efficient operation all comprehensive locking operations that are on an object that is locked only within a single thread but whose side effects are necessary, as determined in step (c), to preserve the correct semantics of said program;
  (ii) simplifying each comprehensive locking operation by replacing with a more efficient operation all comprehensive locking operations that are on an object that is locked in multiple threads, but whose side effects are not necessary, as determined in step (c), to preserve the correct semantics of said program; and
  (iii) removing from the program any comprehensive locking operation that are on an object that is locked only within a single thread, and whose side effects are not necessary, as determined in step (c), to preserve the correct semantics of said program.

17. A machine readable medium containing code for optimizing the locking operations in a computer program having locks in single threads and multiple threads, while preserving the semantics of the program, the code implementing the steps of:

(a) determining the scope of access of all locks involved in locking operations in a program; and (b) determining all actions of said program that require the side effects of some comprehensive locking operation to be performed to preserve the semantics of said program;

(c) transforming said program comprising the steps:
  (i) simplifying each comprehensive locking operation by replacing with a more efficient operation all comprehensive locking operations that are on an object that is locked only within a single thread but whose side effects are necessary, as determined in step) (b), to preserve the correct semantics of said program;
  (ii) simplifying each comprehensive locking operation by replacing with a more efficient operation all comprehensive locking operations that are on an objects that is locked in multiple threads, but whose side effects are not necessary, as determined in step (b), to preserve the correct semantics of said program; and
  (iii) removing from the program any comprehensive locking operation that are on an object that is locked only within a single thread, and whose side effects are not necessary, as determined in step (b), to preserve the correct semantics of said program.

18. A machine readable medium containing code for optimizing the locking operations in a computer program having locking operations on variables, a state of said variable being either "global_escape" or "thread-local", while preserving the semantics of the program, the code implementing the steps of:

a. determining for all locking operations in a program whether the variable being locked is "global_escape" or "thread-local"; and b. transforming said program by simplifying all comprehensive locking operations that are on a variable having a state of "thread-local" by removing the locking, or primary, part of the locking operation.

19. A machine readable medium containing code for optimizing the locking operations in a computer program having locking operations on variables, a state of said variable being either "global_escape" or "thread-local", while preserving the semantics of the program, the code implementing the steps of:

(a) determining for all locking operations in a program whether the variable being locked is "global_escape" or "thread-local";

(b) determining all actions of said program that require the side effects of some comprehensive locking operation to be performed to preserve the semantics of the program; and (c) transforming the program by removing from said program any comprehensive locking operation that is on a variable having a state of "thread-local", and whose side effects are not necessary, as determined in step (b), to preserve the correct semantics of the program.

20. A machine readable medium containing code for optimizing the locking operations in a computer program having locking operations on variables, a state of said variable being either "global_escape" or "thread-local", while preserving the semantics of the program, said method comprising the steps:

a. determining all actions of said program that require the side effects of some comprehensive locking operation on a variable to be performed to preserve the semantics of said program; and b. transforming the program by simplifying all comprehensive locking operations with unnecessary side effects by removing the side effects part of the locking operation, wherein said determining and transforming steps are independent of said state of said variable.

21. A method for optimizing the locking operations in a computer program, said method comprising the steps:

(a) classifying a state of all variables involved in locking operations in the computer program as either "global_escape" or "thread-local", wherein said classifying step uses information about connections in said program between objects and pointers; and (b) transforming said program by removing all simple locking operations at run time which are on variables having a state of "thread-local", wherein the strict semantics of the computer program are preserved.

* * * * *